(12) United States Patent
Khamizov et al.

(10) Patent No.: US 8,940,175 B2
(45) Date of Patent: Jan. 27, 2015

(54) METHOD OF MASS TRANSFER PROCESSES

(71) Applicant: Obschestvo s ogranichennoi otvetstvennost'yu Nauchno—tekhnologicheskaya kompaniya "Novaya khimiya", Moscow (RU)

(72) Inventors: Ruslan Khazhsetovich Khamizov, Moscow (RU); Anna Naumovna Krachak, Krasnogorsk (RU); Elena Borisovna Podgornaya, Sertolovo (RU); Sultan Khazhsetovich Khamizov, Nal'chik (RU)

(73) Assignee: Obschestvo s ogranichennoi otvetstvennost'yu Nauchno—tekhnologicheskaya kompaniya "Novaya khimiya", Moscow (RU)

( * ) Notice: Subject to any disclaimer, the term of this patent is extended or adjusted under 35 U.S.C. 154(b) by 0 days.

(21) Appl. No.: 13/686,117

(22) Filed: Nov. 27, 2012

(65) Prior Publication Data
US 2013/0146543 A1 Jun. 13, 2013

Related U.S. Application Data

(63) Continuation of application No. PCT/RU2011/000377, filed on May 31, 2011.

(30) Foreign Application Priority Data

Jun. 3, 2010 (RU) .............................. 2010122560

(51) Int. Cl.
 *B01J 39/00* (2006.01)
 *B01J 41/00* (2006.01)
 (Continued)

(52) U.S. Cl.
 CPC ............. *B01D 15/00* (2013.01); *B01J 41/043* (2013.01); *B01J 39/043* (2013.01); *B01J 8/025* (2013.01);
 (Continued)

(58) Field of Classification Search
 CPC ........ B01J 39/043; B01J 41/043; B01J 47/02; B01J 47/022; B01J 8/025; B01J 8/0278; B01J 20/28052; B01D 15/00; B01D 11/0219; B01D 12/00; C02F 1/288
 USPC .................................. 210/638, 679, 681, 683
 See application file for complete search history.

(56) References Cited

U.S. PATENT DOCUMENTS

| 4,673,507 A | 6/1987 | Brown |
| 4,747,949 A * | 5/1988 | Barkey .......................... 210/638 |

FOREIGN PATENT DOCUMENTS

| RU | 2034651 A | 5/1995 |
| RU | 2048644 C1 | 11/1995 |

(Continued)

OTHER PUBLICATIONS

Bolto, et al., "Ion Exchange and Solvent Extraction. A Series of Advances," pp. 221-223, vol. 7, Marcel Dekker, Inc., New York and Basel.

(Continued)

*Primary Examiner* — Matthew O Savage
(74) *Attorney, Agent, or Firm* — Patentbar International, P.C.

(57) ABSTRACT

Mass transfer sorption processes involve passage of a processed aqueous solution through a layer of granulated sorbent pre-filled with an organic liquid immiscible with either water or an aqueous solution under treatment. The apparatus for mass transfer of sorption processes is a vertical tank with inlet and outlet fittings loaded with a layer of sorbent disposed between the upper and the lower distribution and drainage systems. The industrial plant for separation of the components of aqueous solutions of inorganic substances includes the said apparatus and the apparatus for the separation of organic liquids from aqueous solutions. The latter has a casing with three chambers, the middle one of which is separated from the first outer one by a grid and from the other by a hydrophobic drainage layer. The emulsion to be separated is introduced into the middle chamber, and the separation results are derived from the outer chambers.

5 Claims, 23 Drawing Sheets

(51) Int. Cl.
  *B01D 15/00* (2006.01)
  *B01J 41/04* (2006.01)
  *B01J 39/04* (2006.01)
  *B01J 8/02* (2006.01)
  *C02F 1/28* (2006.01)
  *B01D 12/00* (2006.01)
  *B01J 47/02* (2006.01)
  *B01J 20/28* (2006.01)
  *B01D 11/02* (2006.01)

(52) U.S. Cl.
  CPC ............... *B01J 8/0278* (2013.01); *C02F 1/288* (2013.01); *B01D 12/00* (2013.01); *B01J 47/022* (2013.01); *B01J 20/28052* (2013.01); *B01D 11/0219* (2013.01)
  USPC ..................... 210/679; 210/681; 210/683

(56) References Cited

FOREIGN PATENT DOCUMENTS

| RU | 2056899 C1 | 3/1996 |
|---|---|---|
| RU | 2077363 C1 | 4/1997 |
| SU | 476009 | 7/1975 |
| SU | 865818 | 9/1981 |
| SU | 1183146 A | 10/1985 |
| SU | 1533750 A1 | 1/1990 |

OTHER PUBLICATIONS

"Chemist Reference Book, Raw Materials and Industry Products of Organic Substances," 1967, pp. 118-119, Second Edition, vol. 6, Publishing House "Chemistry", Leningrad Branch.

Hatch, et al., "Acid Retardation. A Simple Physical Method for Separation of Strong Acids from Their Salts," Industrial & Engineering Chemistry. Process Design and Development, Oct. 1963, pp. 253-263, vol. 2, No. 4.

Khamizov, et al., "General Character of Isothermal Supersaturation in Ion Exchange," Doklady Physical Chemistry, 1997, pp. 310-314, vol. 356, Nos. 1-3, Translated from Doklady Akademii Nauk, 1997, pp. 216-220, vol. 356, No. 2.

Khamizov, et al., "Clean Ion-Exchange Technologies. 2. Recovery of High-Purity Magnesium Compounds from Seawater by an Ion-Exchange Isothermal Supersaturation Technique," Ind. Eng. Chem. Res., 1998, pp. 2496-2501, vol. 37.

Ksenzenko, et al., "Nature and equilibrium of sorption of halogens by anion-exchangers," Chemistry and Technology of Iodine, Bromine and their Compounds, 1979, pp. 244-254, Moscow Publishing House "Chemistry".

Muraviev, et al., "Dynamics of Ion Exchange in Supersaturated Solutions," Langmuir, 1997, pp. 7186-7191, vol. 13.

Senyavin, M. M., "Ion Exchange in Technology and Analysis of Inorganic Substances," 1980, pp. 1-11, Moscow, "Khimiya".

International Search Report dated Sep. 15, 2011 from corresponding International Application No. PCT/RU2011/000377, filed on May 31, 2011.

Yang et al, Adsorbents: Fundamentals and Applications, Ch. 3—Sorbent Selection: Equilibrium Isotherms, Diffusion, Cyclic Processes, and Sorbent Selection Criteria, Jun. 27, 2003, pp. 17-49, John Wiley & Sons, Inc.

* cited by examiner

METHOD OF MASS TRANSFER PROCESSES

RELATED APPLICATIONS

This application is a continuation of International Patent Application No. PCT/RU2011/000377, filed May 31, 2011, which claims priority to Russian Patent Application No. 2010122560, filed Jun. 3, 2010, both of which are incorporated herein by reference in their entirety.

FIELD OF THE INVENTION

Inventions relate to the means of mass transfer sorption processes of component separation of aqueous solutions of inorganic substances, and namely to the method of mass transfer sorption processes, and the apparatus for its implementation, as well as to the part of the industrial plant for the component separation of aqueous solutions of inorganic substances, which also includes the apparatus for the separation of liquid organic substances from aqueous solutions.

BACKGROUND OF THE INVENTION

Mass transfer processing of aqueous solutions containing ionic components, for the purpose of separation of the substances contained in them, concentration of solutions by separate components or a group of components, extraction of individual components or refinement of solutions from individual components or a group of components are one of the most widespread, basic processes in today's chemical productions and technologies.

There are a lot of standard methods for the mass transfer sorption processes of component separation of aqueous solutions of inorganic substances, with application of a variety of sorbents, including ion-exchange materials (e.g. see: Senyavin M. M. "Ion exchange in the technology and analyses of inorganic substances", Moscow, "Chemistry" ed., 1980, p. 272 [1]). These methods include periodic passage of the processed solution through a layer of granular ion exchange material in the column, e.g. through a layer of ion exchange resin, previously transformed into some ionic form. The ion exchange process and to the difference in selectivity of ion exchange resins to various components result in transition of the latter either to solid or to liquid phase, i.e. the processed solution is refined from some components and enriched with others. These methods have the following main limitations: they require application of chemical agents for regeneration of ion exchange resins and re-using of them in the cycles of sorption-desorption. In this regard, standard ion-exchange processes are applied only for the processing of diluted solutions. Processing of concentrated solutions, which are characterized by the so-called "short" sorption cycles, becomes unprofitable because of excess consumption of reagents for regeneration per unit volume of the processed solution. In addition, in processing of solutions in short cycles, longitudinal mixing takes place due to differences in liquid densities in the system, namely of the solution, supplied in the ion-exchange column and the solution in the space between granules in the ion exchange resins' layer, i.e. in the space corresponding to the porosity of the layer. It significantly reduces the efficiency of processing and results in large amounts of waste water in the form of mixed solutions. Particularly, it concerns the so-called once-through ion exchange systems, in which the processed and regeneration solutions are transmitted through mass-exchange columns in the same top-down direction.

Reagent's flow rate and the volumes of waste water are reduced by using the so-called counter-flow patterns, in which regeneration solutions of high density are transmitted through columns bottom-upwards. However, even in this case, the effects of longitudinal mixing are difficult to eliminate because of formation of "flow channels" in the layers of sorption materials, which is caused by the effects of granule compression in ion-exchange materials in concentrated electrolyte solutions [1].

There are also reagentless methods for the mass transfer sorption processes of component separation of aqueous solutions of inorganic substances with the use of ion exchange resins with temperature-controlled selectivity (B. A. Bolto, D. E. Weiss. In Ion Exchange and Solvent Extraction (Eds. J. A. Marinsky and Y. Marcus). Marsel Dekker, New York, 1977. P. 221 [2]; Russian Federation Patent No 2034651, publ. May 10, 1995 [3]. According to these methods, regeneration of ion exchange resins in cyclic processes is performed with hot water, or processed solution, or obtained intermediate solutions at temperatures, different from the temperatures of sorption processes. The indicated methods are also intended for the processing of diluted solutions. Critical degrees of enrichment or purification of solutions, achieved by using them, are limited, among other factors, by free spaces between granules in the sorbent layer. Other limitations of these methods are the small range of applicable thermo-selective ion exchange resins and the increased energy costs, caused by the necessity to heat and (or) chill solutions and ion exchange materials.

In addition, there is a known method for the mass transfer sorption processes of component separation of concentrated aqueous solutions of inorganic substances, in particular, of concentrated mixed solutions of salts and acids with common anion; namely the method of separation of acids from salts with application of ion exchange resins, which is called the method of "acid retardation" (M. J. Hatch, J. A. Dillon. Industrial and Engineering Chemistry Process Design and Development, 1963, V. 2, No 2, p. 253 [4]). There is no ion exchange in the indicated method. Separation of cations is performed on anion exchange resin, rather than on cation exchange resin, taken in the form of anion, cognominal with electrolytes. For example, sulfuric acid is extracted from the mixture of sulfate salts by transmission of mixed solution through ion exchange resin in the sulfate form; in cases of reprocessing of a mixture of nitrates ion exchange resin is used in the nitrate form; and in the cases of chloride reprocessing—in the chloride form. The method is based on the fact that, in concentrated mixed solutions with total concentration of components from 3 to 20 g-ppm, water activity is low and the dissociation degree of salts and, particularly, of acids is significantly lower. Tightly connected ion pairs as well as molecules are formed in the solutions and are capable of non-exchangeable sorption in ion exchange resin. Separation of components takes place during passage of mixed concentrated solutions through a layer of ion exchange resin in the column: at first, the salts of multivalent cations come out of the column; after that, the salts of monovalent cations come out with a small delay; and finally acid solution comes out with considerable delay, comparable by the volume of the treated solution with the volume of ion exchange resin. Once the balance is achieved, i.e. enrichment of ion exchange resin, the compositions of the solutions at the input and output of the column become identical. Separation is carried out as follows: a solution passes through the column until the acid solution is formed; the latter is desorbed along with a small admixture of sorbed salts with the help of water, used as eluent; after that, the column is ready for the separation of the next portion of processed electrolyte solution.

The above mentioned method [4] is almost analogous to those, which involves passage of electrolyte solutions through ion exchange resin or other sorption materials, using water or one of the components of separated mixture as eluent (Patent of Russian Federation No 2056899, publ. Mar. 27, 1996 [5]). In this method, small effects are achieved in the separation of salts, along with the separation of acids from salts.

The main limitations of the methods [4] and [5] are that using standard ion-exchanging apparatus and straight flow during solution passage through the layers of sorption materials, mostly results in mixing of solutions due to the effects of longitudinal mixing of solutions having different densities in the scope of porosity. In case of the counter-flow processes, when concentrated electrolyte solution is passed through the column bottom-up, and water—top-down, use of the majority of well-known ion exchanging resin—(cations and anion exchange resins) also results in large amounts of mixed solutions, caused by lower selectivity of sorption electrolytes in ion exchange resins in comparison with water sorption, and also by the effect of channel formation in the layer of granulated sorption material, due to the compression of granules of ion exchanging materials. In these methods [4, 5], the processed solutions rather than the solutions for regeneration are the chemical agents, lost due to the formation of mixed solutions, or threatening the environment. Nowadays, processes of dilution and leaching are applied in many fields of chemical industries, hydrometallurgy, ferrous and nonferrous metallurgy, electro-planting industry and other fields, resulting in the formation of either expensive or environmentally harmful concentrated solutions, which require reprocessing. In particular, this concerns separation of concentrated solutions of acids and salts.

There is another method of mass transfer sorption processes of component separation of aqueous solutions of inorganic substances (Khamizov R. Kh., Myasoedov B. F., Rudenko B. A., Tikhonov N. A. Reports of the Academy of Science, 1997, Vol. 356, No 2, p.p. 216-218 [6]; D. N. Muraviev, R. Kh. Khamizov, N. A. Tikhonov, V. V. Kirshin. Langmuir, 1997, V. 13, No. 26, p.p. 7186-7192 [7]). This method allows reducing consumption of chemical agents to the minimum amounts, equivalent to the quantities of output products; as well as preventing formation of hardly recyclable mixed solutions. A phenomenon of isothermal supersaturation of solutions in ion exchanging processes is applied in this method, as well as stabilization of supersaturated solutions in the layer of ion exchange resin. The ion exchanging material, used as a sorbent is previously transformed into ionic form, e.g. in the form of metal ion; after that it is treated with concentrated solution of a substance, containing anion, that forms a compound with metal ion, less soluble, than a substance for treatment. For example, to obtain magnesium carbonate, magnesium form of cation exchange resin is treated with concentrated solution of sodium or ammonium carbonate; and to obtain potassium sulfate, potassium form of cation exchange resin is treated with concentrated solution of sodium or ammonium sulfate. In the result of ion exchanging process, a supersaturated solution of target compound is formed in the layer of ion exchange resin and stabilized for some time. At the output of supersaturated solution from the column, clear end product, separated from the solution, is spontaneously crystallized.

The latter is additionally reinforced by regenerating substance and directed into the next cycle of ion exchange resin treatment in the required ionic form. These methods, irrespective of longitudinal mixture effects, do not cause loss of agents or formation of mixed waste water, which require additional treatment. However, the drawbacks of these methods [6, 7] consist in the facts that stabilization of supersaturated solutions in the ion exchange resin layer is temporary, and for many components stabilization period is insignificant. On the one hand, this reduces the range of applied ion-exchanging systems; on the other hand, it causes a risk of column hardening, i.e. sedimentation in the space between granules of the sorbent, in the scope of porosity.

The closest method to the proposed one is the mass transfer sorption process of component separation of aqueous solutions of inorganic substances under the U.S. Pat. No. 4,673,507 (publ. Jun. 16, 1987) [8]. According to this method, aqueous solutions are processed with the use of granular sorption material layers, with reduced spaces available for the processed solution between sorbent granules. Solution is reprocessed according to the indicated method by transmission of it through highly compressed short layer of finely divided granular sorption material. The layer is compressed in different ways: e.g. when working with diluted solutions, a granular ion-exchanging material in the media of highly concentrated electrolyte is loaded in the apparatus, so that the sorbents swell in the media of operating solutions. Another method is loading of redundant amount of sorption material into the open apparatus (without cover), which is forcefully formed into highly compressed layer under the pressure of a cover of special design. Due to high pressure, required for pumping of processed solution through this apparatus, in the method under patent [8], as a rule, a short sorption layer is used. A finely divided sorbent with good kinetic performance is used to reduce the front line length of ion-exchanging or molecular sorption that is required in the use of short layers.

The mentioned requirements show, that there are some limitations in the implementation of the method under patent [8]. Drawbacks of this method include the necessity to apply high pressure. In addition, drawbacks include the short life of sorbents, when using them in the cycles of sorption-regeneration. Finally, in the implementation of the mentioned method, in comparison with standard methods, the increase of stability of supersaturated solutions in the sorbent layer cannot be achieved, which reduces the range of processed solution.

There are apparatus for the implementation of mass transfer sorption processes that are being improved to enhance their efficiency.

Thus, the apparatus under the USSR Inventor's Certificate No 1183146 (publ. Oct. 7, 1985) [9] contains vertical cylindrical body with bottom and cover, designed for filling with sorbent, which has inlet and outlet brunch tubes, placed respectively in the bottom and cover, as well as distribution system, designed in a special way and connected with the inlet brunch tube. This system includes a package of stacked canvases with tunnel cells, which edges on each next canvas are shifted in relation to previous canvas in the horizontal plane in the same direction. This provides torsion of the processed solution and more uniform and intensive interaction of it with the sorbent. However, the described implementation of the distributional sys-tem causes high resistance to the flow of the processed solution, so it will be supplied under increased pressure.

An apparatus under the USSR Inventor's Certificate No 1533750 (publ. Jan. 7, 1990) [10] contains vertical housing with cover, bottom and brunch tubes for input and output of solution, and also a cylindrical microcellular drainage system with installed piston, coaxially placed in the casing. The space between drainage system and housing walls shall be filled with sorbent. A piston performs reciprocating movement that intensifies both absorption of purified solution through the drainage system, and cleaning of its surface from sticky sorbent. The drawback of this apparatus is the need for mechanical drive.

The closest apparatus to the proposed one, designed for the implementation of mass transfer sorption processes by the proposed method, is the apparatus known under the U.S. Pat. No. 4,673,507 [8], designed for the implementation of the method, described in this patent.

This apparatus has a cylindrical body with bottom, cover, wall, upper and lower brunch tubes, installed respectively into cover and bottom. The upper and the lower drainage-distributional systems are installed in the housing, hydraulically connected with upper and lower brunch tubes respectively. The space between these systems shall be filled with granular sorption material. The latter forms a highly compressed layer. The apparatus is operated with the use of finely divided sorbent with good kinetic parameters.

Drawbacks of this apparatus correlate with the above mentioned drawbacks of the method under patent [8], for which this apparatus is intended. In particular, this is the necessity to generate and maintain high pressure during exploitation of the apparatus. This causes fragility of sorbents, when they are used in the cycles of sorption-regeneration. High compression of sorption layer results in high hydraulic resistance, that's why the layer will be short. As a consequence, stability of supersaturated solutions, achieved in the sorbent layer is low and the range of processed solutions is limited.

There are plants of the same function, in particular, under the Russian Federation Patent No 2034651 (publ. May 10, 1995) [3] and under the U.S. Pat. No. 4,673,507 (publ. Jun. 16, 1987) [8].

In the unit under patent [3] a reagentless method is used for the implementation of mass transfer sorption processes of component separation of aqueous solutions of inorganic substances. This unit contains ion-exchanging columns interconnected in parallels, heat-exchanger, several pumps, a selection line of end product and a system of electronic control, thermostat heaters of initial solution and concentrate, a system of pipelines and a range of other parts.

Due to free spaces between sorbent granules in this unit, the achieved degree of enrichment is low. The unit allows processing of only diluted solutions, it has a complicated structure and requires high power consumption, because of thermostat heaters.

The closest unit to the proposed one is the unit under patent [8]. This unit contains an apparatus for the implementation of mass transfer sorption processes and a means of pumping liquid through it. The indicated apparatus has a cylindrical housing with bottom, cover, wall, upper and lower brunch tubes, installed correspondingly in the cover and bottom. Upper and lower drainage-distributional systems are installed in the housing and hydraulically connected, correspondingly with upper and lower brunch tubes. The space between these systems is intended for filling with granular sorption material. The latter forms a highly compressed layer. The apparatus is operated with the use of fine sorbent with good kinetic parameters.

In this plant, free spaces between sorbent granules in the mass transfer sorption apparatus are reduced, that contributes to enhancing of the efficiency of mass transfer sorption processes of component separation of aqueous solutions. However, the indicated reduction of free spaces is achieved by high compression of sorption layer, causing increase of its hydraulic resistance and conditioning the necessity to use a means of generation of high pressure for pumping of liquids. High compression of sorbent layer causes fragility of the sorbent. Besides, the highly compressed layer shall be short, that results in low stability of supersaturated solutions in the sorbent layer and reduces the range of processed solutions.

SUMMARY OF THE INVENTION

The present invention, relating to the industrial unit for the component separation of aqueous solutions of inorganic substances, is aimed at achieving of technological result, consisting in the increase of separation degree at the processing of concentrated solutions including highly acidic concentrated solutions; in enhancing of durability of applied sorption materials; as well as in stabilization of supersaturated solutions in the sorption layer and excluding the necessity of applying means to supply liquid under high pressure. Besides, the indicated increase of efficiency of mass transfer sorption processes, implemented in the proposed unit is achieved, if no special requirements are specified to the size of sorbent granules. Herein after, in the disclosure of the given invention and description of the examples of its application, other types of achieved technical results will be named.

In the proposed method of mass transfer sorption processes, as well as the closest known apparatus under U.S. Pat. No. 4,673,507 [8], the processed aqueous solution is transmitted through a layer of granular sorption material with reduced space between granules of this layer, available for the processed aqueous solution.

To achieve the pointed technological result, the space between granules in the layer of granular sorption material, available for the processed aqueous solution, is reduced by transmission of processed aqueous solution through a layer of mentioned material, previously filled with liquid organic substances or a mixture of such substances, that does not blend neither with water, nor with the processed aqueous solution, which does not also chemically interact neither with the components of processed aqueous solution, nor with sorption material, preventing fluidization of granular sorption material in the stated layer.

The authors have proved, that water or aqueous solutions can be transmitted through a layer of granular sorption material, in the conditions of almost complete absence of free space between granules, as it is filled with organic substances, provided that, a sorption layer is filled alternately with liquid organic substances that does not blend neither with water, nor with the processed aqueous solutions, or with a mixture of such substances. Organic liquid repels water and aqueous solutions, apt to contact with hydrophilic sorbent. Consequently, the processed aqueous solution, transmitted through sorption layer is supplied in the inter-phase boundary between organic liquid and the surface of sorbent granules, forming a finest film, coating each sorbent granule and flowing down along the points of contact between granules. As a result, the components of processed solution immediately appear to be at the output of sorption layer.

Meanwhile, a contacting area of processed aqueous solution with the surface of sorption material increases manifold, that conditions increase of the degree of separation, including processing of concentrated solutions, without specifying special requirements to the size of the granules and without applying high pressure on the sorption layer. Besides, the durability of used sorption materials increases and supersaturated solutions in the sorption layer are stabilized. Due to the choice of liquid organic substances, complying with the above mentioned requirements, combined with the absence of high pressure, compressing sorption material, properties of used sorption material are preserved and its exploitation period is increased in the repeated cycles of sorption-desorption; contamination and loss of solutions and organic substances are prevented.

In particular, liquid organic substances of lower density than that of water (or a mixture of such substances) can be used for filling of a layer of sorption material: e.g. liquid paraffin compounds, unsaturated hydrocarbons, aromatic compounds, organoelemental substances, higher alcohols, ketones, carboxylic acids, ethers and esters. In this case the processed aqueous solution is transmitted through a layer of sorption material in top-down direction.

Liquid organic substances of higher density than that of processed aqueous solution (or a mixture of such substances) can also be used to perform the indicated function: e.g. liquid compounds of halogenated paraffins, including perfluorocarbons, halogenated unsaturated hydrocarbons, halogen and nitro aromatic compounds, organoelemental substances, cyclo-compounds of higher alcohols, ketones, carbon acids, ethers and esters. In this case, the processed solution is transmitted through a layer of sorption material in the bottom-up direction.

The proposed method can be implemented using the proposed apparatus, designed for mass transfer sorption processes.

The proposed invention, relating to the apparatus designed for the implementation of mass transfer sorption processes, is aimed at achieving of technological result, consisting in the increase of separation degree, among other things in processing of concentrated solutions, including highly acidic solutions; in enhancing of durability of sorption materials, and in the stabilization of supersaturated solutions in the sorption layer. Meanwhile, the indicated increase of efficiency of mass transfer sorption processes implemented in the given apparatus, is achieved without specifying special requirements to the size of the sorbent granules and realization conditions of aqueous solution processing, in particular, to the maintenance of high pressure. Herein after, in the disclosure of the invention and description of the examples of its application, other types of achieved technical results will be named.

The proposed apparatus for mass transfer sorption processes, as well as the closest known apparatus under U.S. Pat. No. 4,673,507 [8], contains a vertical cylindrical housing with cover, bottom and wall. The upper and the lower drainage-distributional systems are installed respectively in the upper and lower parts of the housing. Upper and lower brunch tubes are installed correspondingly into the cover and bottom of the housing, which are designed for liquid supply or drainage, and is hydraulically connected with the upper and the lower drainage-distributional systems correspondingly.

To achieve the above mentioned technological result by the proposed apparatus, in contrast to the closest known apparatus, a layer of granular sorption material is placed between the lower and the upper drainage-distributional systems; the space between granules is filled with liquid organic substances or a mixture of such substances, which does not mix either with water-, or with the processed aqueous solution, and does not chemically interact either with the components of processed aqueous solution, or with granular sorption material. The upper drainage-distributional system is installed and hydraulically connected with the upper brunch tube, allowing its movement in vertical direction; there is a free space between it and the housing cover, where a pressurization unit is placed, intended for the action over this system in vertical direction and prevention of fluidization of the granular sorption material, placed under it. One of two indicated brunch tubes is an input brunch tube of the named apparatus, intended for supply of processed solution and water; and another is an output brunch tube of the named apparatus. A faucet is installed on the lower brunch tube.

The use of a layer of granular sorption material in this apparatus, in which free space between granules is filled with liquid organic material, results in almost complete absence of free space between granules. Organic liquid repels water and aqueous solution, apt to contact with hydrophilic sorbent. Consequently, the processed aqueous solution, transmitted through sorption layer is supplied in the inter-phase boundary between organic liquid and the surface of sorbent granules, forms a finest film, coating each sorbent granule and flows down along the points of contact between granules. As a result, the contact area of processed aqueous solution with the surface of sorption material increases manifold. This fact, in its turn, conditions the increase of separation degree in processing of concentrated solution and eliminates special requirements to the size of sorbent granules and necessity to apply high pressure. The pressure, exerted by pressurization unit over a layer of granular sorption material through upper drainage-distributional system is incommensurably low compared with the pressure in the compressed layer in the apparatus under patent [8], as in the proposed apparatus it is applied only to prevent fluidization of sorption material in the layer. At the same time, the durability of used sorption materials increases and supersaturated solutions in sorption layer are stabilized. The choice of liquid organic substances, complying with above mentioned requirements, combined with the absence of high pressure, compressing sorption material, provides preservation of this material's properties, increases its exploitation period, and prevents contamination and loss of solutions and said organic substances. The faucet on the lower brunch tube prevents fluid leakage out of apparatus, which is not connected with the main feed lines of liquid supply or removal.

In the proposed apparatus, in one of particular cases of its implementation a hydraulic connection between upper drainage-distributional system and upper brunch tube can be accomplished though a flexible tube. In this case, pressurization unit can be made of a layer of porous elastic material, such as foam rubber, filling the space between housing cover and upper drainage-distributional system, and surrounding specified flexible tube. Pressurization unit can be made of a disk, placed above upper drainage-distributional system, with holes for the mentioned flexible tube and a coiled spring, installed between this disk and a housing cover, and surrounding this flexible tube.

In another particular case, pressurization unit can be made of a piston, placed above upper drainage-distributional system, with a hole in the center for tight passage of the specified flexible tube; provided that the cover in its upper part is equipped with a brunch tube for connection with the source of pressurized gas or liquid.

Each of the mentioned drainage-distributional systems can be designed as a horizontal, radiating drainage element for liquid input and output, connected with the one and the same brunch tube, placed in the center of this system.

Each drainage element can be designed as a tube with holes, impermeable for granular sorption material, or closed by slotted screen, impermeable for this material. Each drainage element can also be designed as a cylinder with walls, made of porous material with pores, impermeable for granular sorption material.

Hydraulic connection of upper drainage-distributional systems with upper brunch tube can also accomplished by bellows. In this case, pressurization unit can be made of a layer of elastic porous material, such as foam rubber, filling the space between housing cover and upper drainage-distributional system, and surrounding the specified bellows.

In the implementation of hydraulic connection between upper drainage-distributional system and the upper brunch tube by bellows, pressurization unit can be made of a disk, placed above upper drainage-distributional system, with holes for the mentioned bellows and a coiled spring, installed between this disk and housing cover, surrounding the specified bellows.

Variety of possible structures of different parts of the apparatus and their combinations provide freedom of choice at designing of the apparatus, according to technological characteristics of manufacturing conditions and the forthcoming operation.

In any of the above mentioned designing of the proposed apparatus, the specified liquid organic substances or a mixture of such substances, which fill the space between granules of granular sorption material, can be of lower density, than that of water. In this case, the upper brunch tube is the inlet brunch tube of the named apparatus for supply of processed solution and water, and the lower brunch tube is an output brunch tube.

Besides, in any of the above mentioned cases of apparatus designing, the specified liquid organic substance or a mixture of such substances, which fill the space between granules of granular sorption material, can be of higher density than that of the processed aqueous solution. The upper brunch tube is the output brunch tube of the named apparatus for supply of processed solution and water, and the lower brunch tube is an input brunch tube.

These two possibilities enlarge the choice of liquid organic substances, intended for filling of the space between granules of granular sorption material, allowing transmission of processed aqueous solution through the apparatus, both in top-down and bottom-up directions (correspondingly in the first and the second cases, described above).

In any of the above named cases of designing of the apparatus and its parts, there may be a space between lower drainage-distributional system and the bottom of the housing filled with neutral granular material, mainly gravel, of larger granule size than that of granular sorption material.

This layer prevents mixing of a liquid in the layer of sorption material with the liquid in the stagnant zone under lower drainage-distributional system.

The proposed apparatus for the implementation of mass transfer sorption processes is a part of the proposed industrial plant for the component separation of aqueous solutions of inorganic substances.

The proposed invention, relating to the apparatus designed for the implementation of mass transfer sorption processes, is aimed at achieving of technological result, consisting in the increase of separation degree, among other things in processing of concentrated solutions, including highly acidic solutions; in enhancing of durability of sorption materials, and in the stabilization of supersaturated solutions in the sorption layer. Meanwhile, the indicated increase of efficiency of mass transfer sorption processes implemented in the given apparatus, is achieved without specifying special requirements to the size of the sorbent granules and realization conditions of aqueous solution processing, in particular, to the maintenance of high pressure. Herein after, in the disclosure of the invention and description of the examples of its application, other types of achieved technical results will be named.

The proposed industrial plant for the component separation of aqueous solutions of inorganic substances, as well as the closest known apparatus under U.S. Pat. No. 4,673,507 [8], contains an apparatus for the implementation of mass transfer sorption processes and a means for liquid pumping. An apparatus for the implementation of mass transfer sorption processes contains a vertical cylindrical housing with cover, bottom and wall. Upper and lower drainage-distributional systems are installed respectively in the upper and lower parts of the housing. Upper and lower brunch tubes, installed correspondingly into the cover and bottom of the housing, are designed for liquid supply or drainage, and correspondingly hydraulically connected with upper and lower drainage-distributional systems.

To achieve the above mentioned technological result in the proposed industrial plant, in contrast to the closest known apparatus, a layer of granular sorption material is placed between lower and upper drainage-distributional systems; the space between granules is filled with liquid organic substances or a mixture of such substances, which does not mix either with water, or with the processed aqueous solution, and does not chemically interact neither with the components of processed aqueous solution, nor with granular sorption material. The upper drainage-distributional system is installed and hydraulically connected with upper brunch tube, allowing its movement in vertical direction, providing free space between it and the housing cover, where means of pressurization is placed, intended for the action over this system in a vertical direction and prevention of fluidization of the granular sorption material, placed under it. One of the two indicated brunch tubes is an input brunch tube of the named apparatus and an input brunch tube of the entire unit, intended for the supply of processed aqueous solution and water; and another is an output brunch tube of the named apparatus. A faucet is installed on the lower brunch tube.

In addition, the indicated industrial plant is equipped with an apparatus for separation of liquid organic substances from aqueous solutions, which has an input for the separated emulsion, an outlet for the liquid organic substance to be separated, and an outlet for aqueous solution, purified of liquid organic substance. In the specified apparatus, an outlet for aqueous solution, purified of liquid organic substance, serves as an outlet of the entire industrial unit. An input for separated emulsion is connected with an outlet brunch tube of the apparatus, intended for the implementation of mass transfer sorption processes. An outlet for liquid organic substances to be separated is connected with the apparatus for the implementation of mass transfer sorption processes by the line on the form of a tube; which end is installed in the housing wall of this apparatus, near the drainage-distributional system that is hydraulically connected with the input brunch tube of this apparatus for the processed aqueous solution and water, from the side of a layer of granular sorption material. The specified means for pumping of liquid is a circulating pump with return valve, installed in the indicated line.

Operation of the apparatus for the implementation of mass transfer sorption processes, in which the space between granules in a layer of granular sorption material is filled with liquid organic substances, results in almost complete absence of free space between granules, as it is filled with organic liquid. Organic liquid repels water and aqueous solutions, apt to contact with hydrophilic sorbent. Consequently, the processed aqueous solution, transmitted through sorption layer is supplied in the inter-phase boundary between organic fluid and the surface of sorbent granules, forming a finest film, coating each sorbent granule and flowing down along the points of contact between granules. As a result, the contact area of processed aqueous solution with the surface of sorption material increases manifold. This fact, in its turn, conditions the increase of separation degree in the processing of concentrated solution and eliminates special requirements to the size of sorbent granules and the necessity to apply high pressure. At the same time, stabilization of supersaturated solutions in the sorption layer is provided. Through the choice of liquid organic substances, complying with above mentioned requirements, combined with the absence of high pressure, compressing sorption material, properties of this material are preserved, its exploitation period is increased, and contamination and loss of solutions and the named organic substances are prevented. Pressure exerted by pressurization unit over a layer of granular sorption material in the apparatus for the implementation of mass transfer sorption processes through upper drainage-distributional system is incommensurably small, compared with pressure in the compressed layer under patent [8], as in the proposed industrial unit it is applied only to prevent fluidization of sorption material in the layer.

Use of the apparatus, intended for the separation of liquid organic substances from aqueous solutions, as a part of the proposed industrial unit and connected in the described manner with the apparatus for the implementation of mass transfer sorption processes, prevents loss of liquid organic substances, and provides complete refund of this substance in the unit for the implementation of mass transfer sorption processes. The refund is provided by circulating pump with return valve, installed in the indicated line, connecting two apparatus.

In one of particular cases, in the proposed industrial unit the specified liquid organic substance or a mixture of such substances, which fill the space between granules of granular sorption material, can be of lower density than, that of water. In this case, the upper brunch tube of the apparatus for the implementation of mass transfer sorption processes is the inlet brunch tube of this apparatus and the entire industrial unit, designed for supply of processed aqueous solution and water; the lower brunch tube of this apparatus is an output brunch tube. The use of a faucet on this brunch tube does not only prevent uncontrolled leakage of liquid from mass transfer sorption apparatus, but in combination with other faucets also allows switching over in operational conditions, as well as in the process of filling of the apparatus with liquids during make-ready procedures. In this particular case the input brunch tube of this apparatus (the upper brunch tube) is also equipped with a cock, which in combination with other faucets, allows switching over in operational conditions of industrial plant and in the process of filling of the apparatus with liquids during make-ready procedures.

In another particular case the specified liquid organic substances or a mixture of such substances, which fill the space between granules of granular sorption material, can be of higher density than that of the processed aqueous solution. In this case, the lower brunch tube of the apparatus for the implementation of mass transfer sorption processes is the inlet brunch tube of this apparatus and the entire industrial unit, intended for the supply of processed aqueous solution and water; the upper brunch tube of this apparatus is an output brunch tube. In this particular case the cock, installed on the lower brunch tube, as well as in the previous case, is designed to prevent uncontrolled leakage of liquid from mass transfer sorption apparatus. In this regard, an output brunch tube of this apparatus (the upper brunch tube in this case) is also equipped with a cock, which in combination with other faucets, allows switching over in operational conditions of industrial unit and in the process of filling of the apparatus with liquids during make-ready procedures.

The two described ways of implementation of the proposed industrial unit allow selection of liquid organic substances of higher or lower density, than that of the processed solution; and supplying of this solution both in bottom-up and top-down directions.

The end of a tube, connecting the output of the apparatus, designed for separation of liquid organic substances from aqueous solutions, with the apparatus for mass transfer sorption processes, is installed in the housing of this apparatus and can be closed by a drainage grid, impermeable for granular sorption material. This prevents clogging of the tube that may cause disfunctioning of the unit.

In the proposed industrial unit the apparatus for the separation of liquid organic substances from aqueous solutions may have a housing, made in the form of a vertical cylinder with closed ends, which contains two outer chambers, adjusting to ends, and a middle chamber placed between them. The latter is separated from one of the outer chambers by a grid, designed for prevention of turbulence, and from the other by hydrophobic drainage layer, permeable for liquid organic substance or a mixture of such substances, by which the space is filled between granules in granular sorption material in the mass transfer sorption apparatus; but impermeable for water and processed aqueous solution. The first output brunch tube is installed in the end of the outmost chamber, separated from the middle chamber by hydrophobic drainage layer, and reaches no more than mid-point of this chamber. In the end of the other outmost chamber, separated from the middle chamber by a grid, an input brunch tube is installed, which goes through the mentioned chamber and a grid into the middle chamber and reaches at least its mid-point; as well as the second output brunch tube, which reaches no more than mid-point of the indicated outmost chamber. The specified input brunch tube is an input of this apparatus for the separated emulsion; the first output brunch tube is an output for liquid organic substance to be separated, and the second output brunch tube is an output for the aqueous solution, purified of liquid organic substance.

Such designing of the apparatus for the separation of liquid organic substances from aqueous solutions in the proposed industrial unit, allows efficient separation directly in the process of operation at a speed, corresponding to the speed of liquid supply, in both bottom-up and top-down directions.

In the proposed industrial unit, the indicated hydrophobic drainage layer of the apparatus, intended for the separation of liquid organic substances form aqueous solutions may contain a disk with holes, made of water-proof material, or a layer of granules made of water-proof material, previously treated with liquid organic substances, identical to those, by which the space between granules of sorption material is filled in the apparatus of mass transfer sorption processes. PTFE or carbon-omental gland material can be used as the indicated water-proof material.

Hydraulic connection of the upper drainage distributional system of the apparatus for mass transfer sorption processes in the proposed industrial unit with upper brunch tube of this apparatus's housing can be performed with a flexible tube.

In this case, the pressurization unit can be made of a layer of elastic porous material, filling the space between housing cover, upper drainage-distributional system and the specified surrounding flexible tube.

There may be a space between lower drainage-distributional system and the bottom of the housing of the apparatus for mass transfer sorption processes in the proposed industrial unit filled with neutral granular material, mainly gravel, of larger granule size, than that of granular sorption material.

Variety of possible structures of different parts of the apparatus and their combinations provide freedom of choice at the designing of the apparatus, according to the technological characteristics of manufacturing conditions and the forthcoming operation.

Additional brunch tubes with faucets can be installed in the housing of the apparatus for mass transfer sorption processes, near drainage-distributional systems, from the side of a layer of granular sorption material, as well as in the middle chamber of the apparatus for the separation of liquid organic substances from aqueous solutions and in the end of the outer chamber of this apparatus, separated from the middle chamber by hydraulic drainage layer. A mode of filling of the apparatus with indicated liquid organic substances or a mixture of such substances can be implemented by these faucets. These faucets can help to carry out the mode of apparatus refill with the specified organic liquid substance or a mixture of such substances.

The presented inventions are illustrated with the following examples 1-16.

Example 1 pertains to implementation of sorption process of nepheline concentrate acid leaching synthetic brine processing, in accordance with the presented method.

Examples 2 and 3 pertain to processing of solution, similar to example 1, but without the provided by the presented method of filling space between granules of sorption material with organic liquid substance, correspondingly when letting the processed solution pass from top to bottom and from bottom to top.

Examples 4-9 illustrate the use of different organic liquid substances when performing sorption process of synthetic brine processing, similar to the above given examples, in accordance with the presented method.

Example 10 pertains to the sorption decomposing of acid and saline elements when performing sample preparation in analytical chemistry in accordance with the presented method.

Example 11 pertains to implementation of ion-exchange process of acid iodine desorption from anion-exchange substances in iodine extraction technology from hydro-mineral raw materials in accordance with the presented method.

Example 12 pertains to implementation of the technology similar to the given in example 11, but without the provided by the presented method of filling space between granules of sorption material with organic liquid substance.

Examples 13 and 14 actually pertain to sorption of ammonium ion and desorption of potassium ion from the potassium form of cation resins in the ion-exchange technology of production of non-chlorous potassium fertilizers by the proposed mean with different concentrations of processed solution.

Examples 15 and 16 pertain to sorption process of processing of synthetic bines of nepheline concentrate acid leaching, as specified in the example, by means of proposed industrial plant with the proposed apparatus for mass-transferring sorption processes.

BRIEF DESCRIPTION OF THE DRAWINGS

The proposed inventions are illustrated by drafts, FIGS. 1-24.

DETAILED DESCRIPTION OF THE PREFERRED EMBODIMENTS

Figure 1:
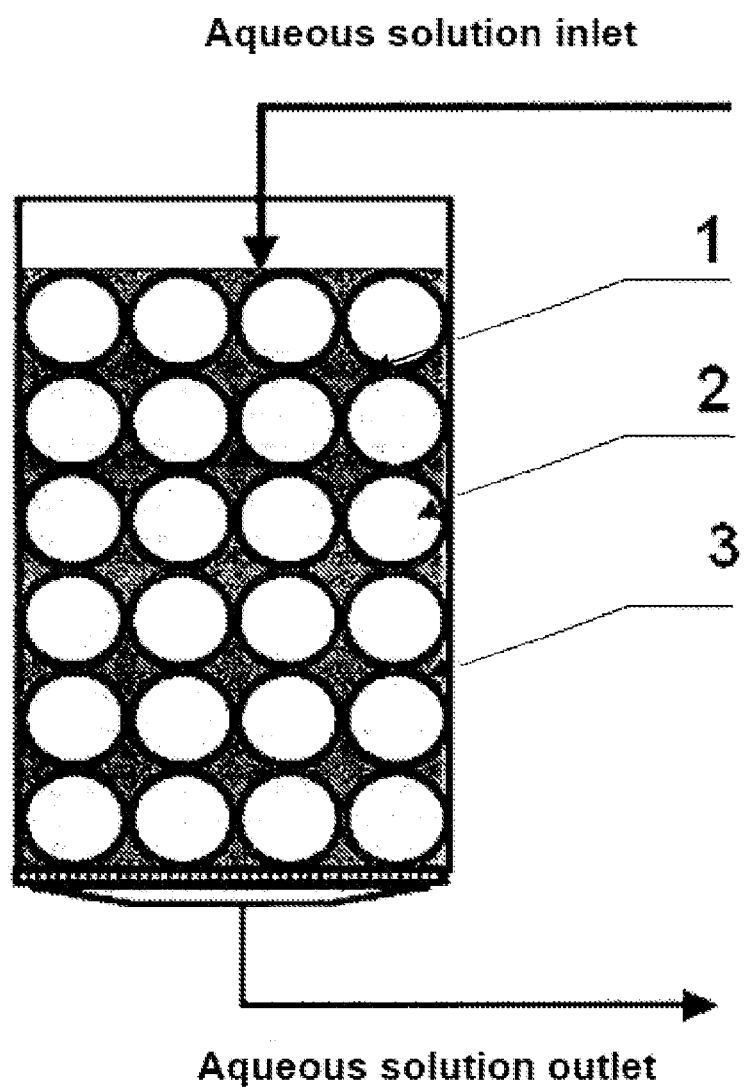
FIG. 1 illustrates the present method and operating principle of the present apparatus, intended for its implementation.

The proposed method of the implementation of mass transfer sorption processes is clarified by FIG. 1, which shows a scheme of formation of dynamic films from the processed liquid, transmitting through sorption layer. This method involves transmission of the processed aqueous solution through a layer of granular sorption material, previously filled with liquid organic substances or a mixture of such substances, which does not mix either with water, or with the processed aqueous solution, and does not chemically interact either with the components of the processed aqueous solution, or with sorption material; preventing fluidization of granular sorption material in the pointed layer.

As we noted before, in the disclosure of the proposed method, the authors discovered the effect, consisting in the fact that, at transmission of the processed solution through a layer of sorption material, filled in the described way, with virtually no free space between granules, organic liquid repels water and aqueous solutions, contacting hydrophilic sorbent. As a result, the processed aqueous solution, transmitted through sorption layer, as it is shown on the FIG. 1, is supplied in the inter-phase boundary between organic liquid 1 and the surface of sorbent granules 2, forming a finest film 3, coating each sorbent granule and flowing down along the points of contact between granules. Experimentally, the effect is manifested in the fact that the components of a solution, transmitted from the top are immediately on the output of the layer. The mentioned contact between granules is achieved if there is no fluidization. It is enough to apply small pressure on the layer to achieve it (about 0.1 bars).

The choice of liquid organic substances or a mixture of such substances in accordance with the indicated requirements can be performed on the basis of tubular data on the properties of organic substances, given in the directories on chemistry (e.g. see: "Chemist's Directory". Under edition of Nicolsky B. P., in 6 volumes, v. 6, Khimizdat, Leningrad, 1963 [13]).

Laboratory ion-exchanging columns are used in the Examples 1-14 given below, which fulfill functions of the apparatus for mass transfer sorption processes. Layers of granular sorption materials, filled with liquid organic substances or a mixture of such substances are withheld by pressing of loads in the columns by pieces of foam rubber, installed in the upper part of the columns Not only the operations corresponding to the proposed method are described in the examples, but also operations relating to the preparations of experiments and another operations, not related to the proposed method as such.

Example 1

The proposed method is used to implement a sorption process of treatment of standardized test solution of acid leaching of nepheline concentrate that is a concentrated solution of a mixture of aluminum nitrate, sodium and nitric acid. Implementation includes the following operations.

A. The anion exchange resin sample AB-17, produced in the commercial form and swollen in the distilled water, is transported in the ion-exchanging column; treated by transmission through the column of 300 ml 1M of hydrochloric acid solution for removal of contaminants; washed by distilled water until neutral reaction occurs; transferred into OH-form by transmission through the column of 600 ml 1M of NaOH solution and washed by distilled water until neutral reaction. Here and further the completeness of washing is controlled by universal indicator paper. After that, anion exchange resin is transferred into $NO_3$-form by transmission of 300 ml 1M of nitric acid solution through the column, and thoroughly washed with distilled water. Parameters of the received anion exchange resin AB-17-$NO_3$ load are given in the Table 1.

TABLE 1

Parameters of anion exchange resin AB-17 load

| Feed rate, cm3 | Layer height, cm | Column section, cm2 | Free load volume, cm3 | Loading grain size, mm |
|---|---|---|---|---|
| 120 | 20 | 6 | 40 | 0.75 ÷ 1.00 |

B. Water from free (porous) space of the column is displaced and a layer of anion ex-change resin AB-17 in the received $NO_3$-form is filled with peralgonic (nonanoic) acid. For that purpose, peralgonic acid is transmitted though the column in the top-down direction until all of water (40 ml) is displaced out of column.

C. Experiments are carried out on the component separation of initial standardized test solution of acid leaching of nepheline concentrate, containing the following substances in the corresponding concentrations: $Al(NO_3)_3$—2.6 mole/l (553.8 g/l); $HNO_3$—1.3 mole/l (81.9 g/l); $NaNO_3$—0.92 mole/l (78.2 g/l).

For this purpose, the indicated solution is transmitted through anion exchange resin in the top-down direction at a speed of 0.037 column volumes per minute until leveling of concentration $HNO_3$ at input and output of the column. Total amount of transmitted solution is 157 ml. After that, the supply of processed solution is stopped and anion exchange resin is washed with distilled water. Distilled water is supplied at the same speed, in the top-down direction until washing out of anion exchange resin load from nitric acid. Total amount of transmitted of water is 113 ml. The total amount of fluids, transmitted through the column during processes under Item C is 270 ml. The process flow is seen by the results of experiment, given on the FIG. 2.

D. All of operations, listed in the Item C are repeated, and output diagrams shown on the FIG. 2 are received again.

As we can see on this figure, nitric acid (output diagram 4) lingers on the anion exchange resin during transmission of the processed solution, and then is totally displaced out of the column during water transmission. At the same time, aluminum and sodium nitrates (diagrams 5 and 6 respectively) start emerging out of the column almost immediately in the process of transmission of the processed standardized test solution. Thus, the proposed process includes separation of saline components and acid.

The first 125 ml of output solution cuts from the column (until dotted line 7 on the FIG. 2) are combined, and a working solution is received with the average content of salt components close to its initial content (552 g/l of aluminum nitrate), with average residual content of nitric acid no more than 10% of its original content ($\overline{C}/C_0 \leq 0.1$). Working solution is directed at neutralization and extraction of aluminum hydroxide by alkaline treatment. Cuts from 125 ml to 165 ml (between lines 7 and 8) are combined, and the solution of total amount 40 ml and the composition similar to the composition of initial standardized test solution is returned for reprocessing. Acid cuts from 165 ml to 270 ml are used to dilute concentrated nitric acid and to receive working acid solution, used for leaching of aluminum out of nepheline concentrate.

Implementation of sorption treatment of the solution of acid leaching of nepheline concentrate by the proposed method, carried out before leaching, for the purpose of extraction of aluminum hydroxide allows reduction of consumption: 25% of acid, 25% of alkaline and 50% of water.

Example 2

Comparable with the Methods, Described in [4] and [5]

The process is carried out as described in the Example 1, except for the operations under Item B, i.e. before implementation of the operations under Item C, the free volume in the anion exchange resin layer is filled with distilled water instead of liquid organic substance. Operations under Item C are carried out just as in the Example 1, at transmission of the initial standardized test solution in the top-down direction. No separation of saline components and acid is observed in all solution cuts, coming out of column, what is caused by longitudinal dispersion of components form the processed solution, which is denser than water.

Example 3

Comparable with Methods Described in [4] and [5]

Figure 2:
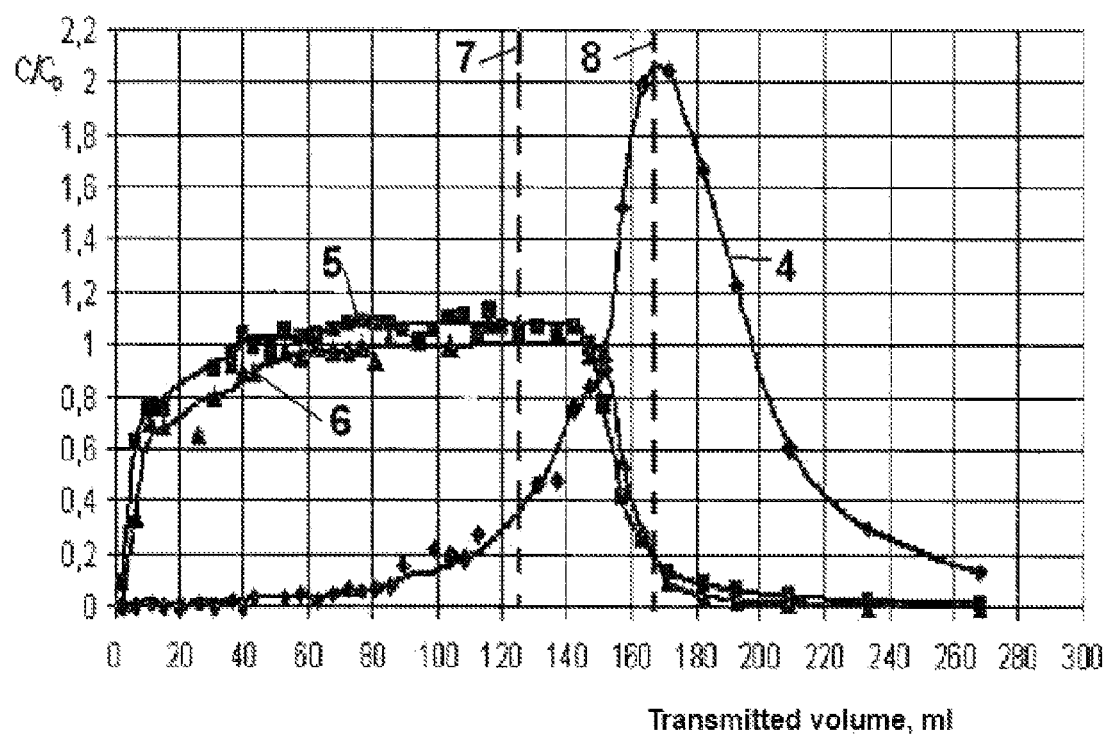
FIG. 2, relating to the example 1, shows the diagrams of separation curves with water, i.e. distribution of the concentration of the components in the solution cuts), emerging from the sorption layer, on the stages of sorption and desorption in the implementation of sorption processes of treatment of standardized test solution of acid leaching of nepheline concentrate in accordance with the present method.

The process is carried out as described in the Example 1, except for the operations under Item B, i.e. before implementation of the operations under Item C, the free volume in the anion exchange resin layer is filled with distilled water. Operations under Item C are carried out just as in the Example 1, except for the fact, that the standardized test solution is transmitted through the column in the bottom-up direction. Standardized test solution in the amount of 230 ml is transmitted through the column to achieve the initial concentration of acid at the output of the column. After that, additional 90 ml of distilled water is transmitted until complete displacement of acid out of column. The process flow is seen by the results of experiment, given on the FIG. 3. Output diagrams, like on the FIG. 2, are marked by numbers 4 (acid), 5 (aluminum nitrate) and 6 (sodium nitrate).

Figure 3:
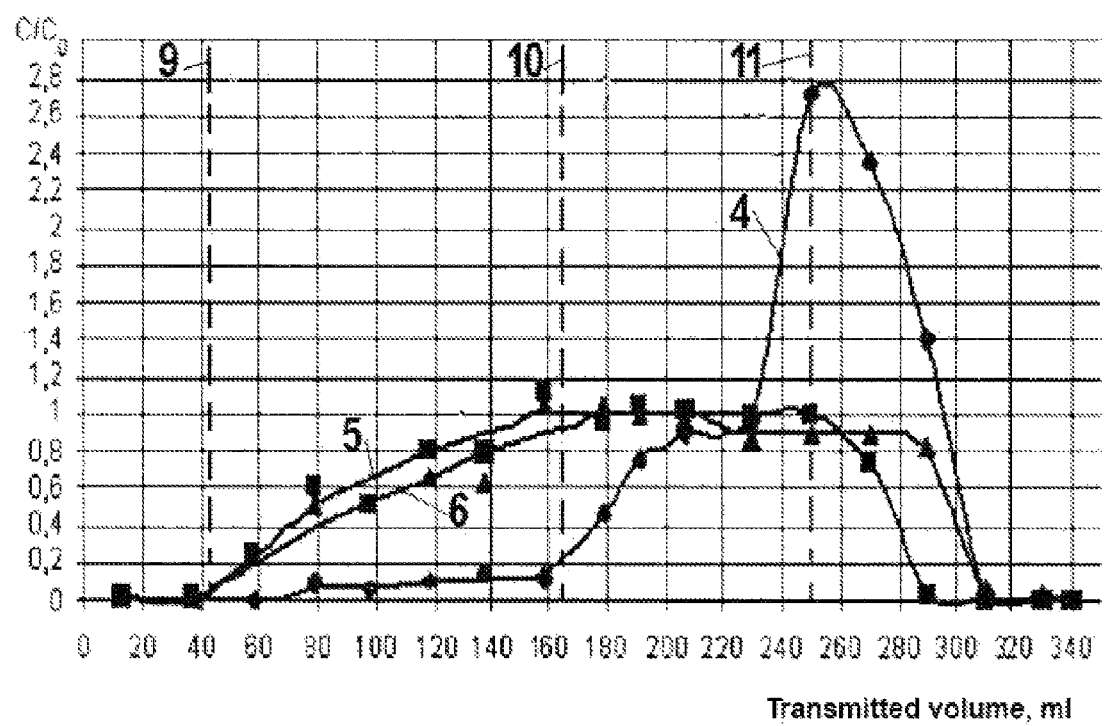
FIG. 3, relating to the Example 3 shows output separation curves in the implementation of sorption processes of treatment of the same solution as in the Example 1, but without filling of the space between granules of sorption material with liquid organic substance, prescribed by the present method.

At the beginning of the process water comes out of column (40 ml); salt components come out in the way it is shown on the FIG. 3, starting from the point, bounded by dashed line 9. At this moment, component separation becomes less effective, compared with the Example 1: the output front line of salt components and acid is strongly eroded, that leads to the output of diluted solutions; acid starts coming out almost simultaneously with the output of salt components. All other conditions being equal, duration of the process is longer than in the Example 1 for almost 20%.

The next 125 ml of solution cuts (between lines 9 and 10 on the FIG. 3), coming out of column after water output, are combined and a working solution is obtained with the average content of salt components close to half of its initial content, and with average residual content of nitric acid no more than 10% of the original content ($\overline{C}/C_0 \leq 0.1$), which is directed at neutralization and extraction of aluminum hydroxide by alkaline treatment. Cuts from 165 ml to 250 ml (between lines 10 and 11) are combined and the solution of total amount 85 ml, which composition is similar to the composition of initial standardized test solution is returned for reprocessing. Acid cuts from 250 ml to 330 ml are used to dilute concentrated nitric acid and to receive working acid solution, used for leaching of aluminum from nepheline concentrate.

The process of sorption treatment of acid leaching solution of nepheline concentrate, carried out before alkali treatment, for the purpose of extraction of aluminum hydroxide in the described example allows reduction of consumption: 12.5% of acid, 12.5% of alkaline and 30% of water.

Comparison with the Example 1 shows, that at longer duration of the process, if it is carried out by the formerly known method, the aluminum weight, obtained in the solution for its further processing, is almost twice as little; besides, the correlation of concentrations of salt components and acid in this solution is also twice as little, compared with the process, conducted by the proposed method.

Examples 4-9

See Table 2

The processes are carried out in full compliance with the description, given in the Example 1, except for the fact, that different organic liquids and mixtures, enumerated in the Table 2, are used to fill the layer of sorption material. The obtained results are also given in this Table.

TABLE 2

The results of processing of standardized test solution of nepheline concentrate leaching with application of different organic liquids

| Example No | Organic liquid | The volume of the obtained solution with average acid content $\overline{C}/C_0(HNO3) < 0.1$ | Concentration of aluminum nitrate in the solution | The volume of water for acid desorption and regeneration of ion exchange resin |
|---|---|---|---|---|
| 4 | Hepantol | 121 | 542.6 g/l | 110 |
| 5 | Decanol | 128 | 552.5 g/l | 115 |
| 6 | Octanoic acid | 123 | 541.8 g/l | 110 |
| 7 | Naphtha | 118 | 540.5 g/l | 110 |
| 8 | A mixture of Pelargonic acid and kerosene (50/50% of volume) | 124 | 548.6 g/l | 115 |
| 9 | A mixture of Decanol and Naphtha (50/50% of volume) | 126 | 550.9 g/l | 115 |

Table 2 shows, that almost the same results are achieved at the use of various organic liquids.

Example 10

The use of proposed method leads to the reduction of acidity of highly acidic solution of metal cation exchange resins, obtained by decomposition of hard to analyze solid sample (ostentine) in the autoclave, in the process of analytical sample preparation and intended for further sorption concentration and analytical determination.

Composition of the received solution of nitrates in the 5.89 M of nitric acid is: 1.47 mole/l of calcium, $1.10^{-3}$ mole/l of iron (II), $4.10^{-4}$ mole/l of manganese (II), $1.10^{-4}$ of copper (II), $2.10^{-4}$ of zinc (II) and $1.10^{-4}$ mole/l of cobalt.

The ion-exchange column is used with load of 25 ml of anion exchange resin AM 102 in the nitrate form with layer parameters: cross-sectional area: S=1.0 cm2, layer height: l=25 cm.

Water from the free porous space of the column is displaced, and the anion exchange resin layer AM 102 in the received $NO_3$-form is filled with decanol. For that purpose, decanol in the amount of 8.5 ml is transmitted through the column in the top-down direction, until all of water (8.5 ml) is displaced out of the column.

Initial solution in the amount of 25 ml is transmitted through the column at a speed of 0.2 ml/min in the top-down direction, selecting cuts in the amount of 3 ml.

Figure 4:
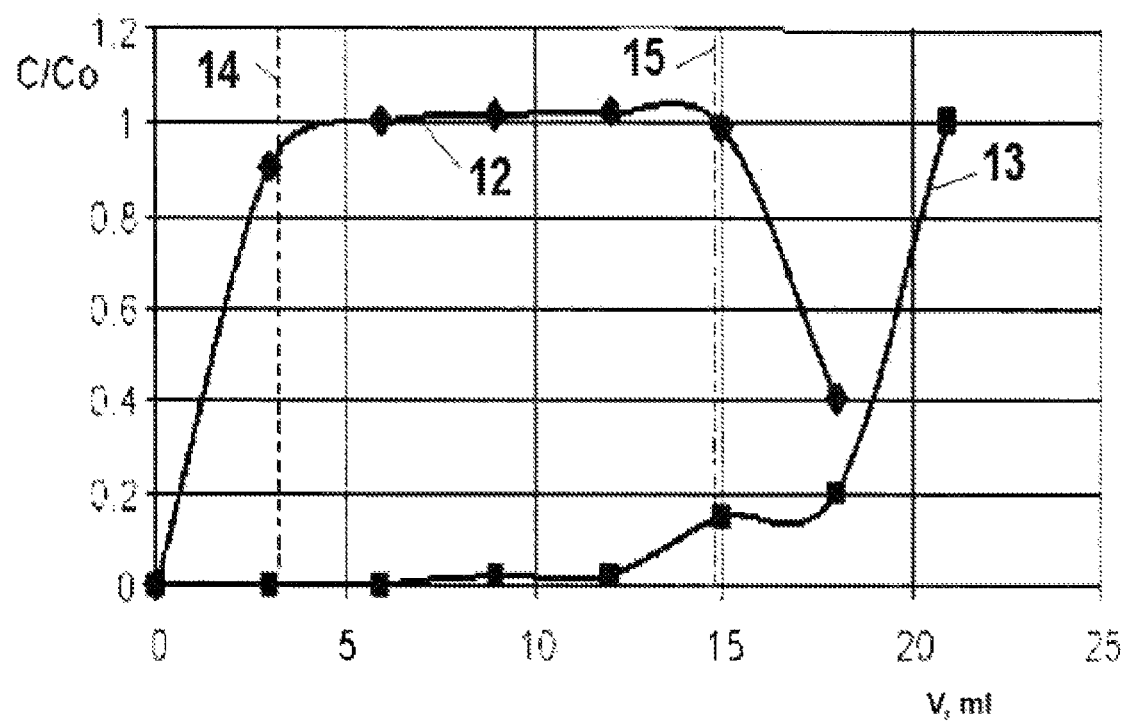
FIG. 4, relating to the Example 10, shows output diagrams of sorption separation of acid and saline components in the implementation of the process of sample preparation in the analytical chemistry, in accordance with the present method.

Output curves are shown on the FIG. 4: 12—for nitrates of corresponding metals in the example of cobalt nitrate, and 13—for nitric acid. In the area, bounded by lines 14 and 15, concentration of metals in the output cuts remains almost the same, in comparison with the initial solution (C/C0=1), and the acid content becomes insignificant. The indicated cuts of output solution form the column are combined and brought to contact with 50 mg of selective DETATA sorbent; that results in the achievement of concentration of micro-components 240 times as much. Metal content in the solid phase of sorbents is defined by the use of atomic absorption with graphite furnace or X-ray fluorescence.

Example 11

On the basis of the proposed method iodine desorption and anion exchange resin regeneration is performed in the working cycles of iodine extraction from the iodine containing natural brines.

A. 400 ml of solution, obtained by injection of 500 ml of 1% sodium hypochlorite solution into 400 ml of natural brine with initial concentration of iodide as 40 mg/l and total salinity of 56 g/l, is transmitted through the column, containing 40 ml of strong-basic anion exchange resin AB-17 in the Cl form with the following parameters of a layer: cross-sectional area: S=1.6 cm2; layer height: l=25 cm. Solution is transmitted in the bottom-up direction, at a speed of 25 ml/min through the layer of anion exchange resin, forming at such speed of fluidization. At this time, iodine is extracted from the solution, and anion exchange resin passes into J2Cl form (see: Ksenzenko V. I., Stasinevich D. M. "Chemistry and technology of iodine, bromine and their compounds", Moscow, "Chemistry", p. 304 [14]). In the flow of the pointed process 15.6 g of iodine is absorbed per the whole layer of anion exchange resin in the column.

B. After completion of the sorption process, the solution remained in the column is drained through lower output until the level of top layer of ion exchange resin. Solution from free, porous space of the column is displaced; and anion exchange resin layer is filled with decanol. For that purpose, 13.5 ml of decanol is transmitted through the column in the top-down direction, until all of water (13.5 ml) is displaced out of column.

Figure 5:
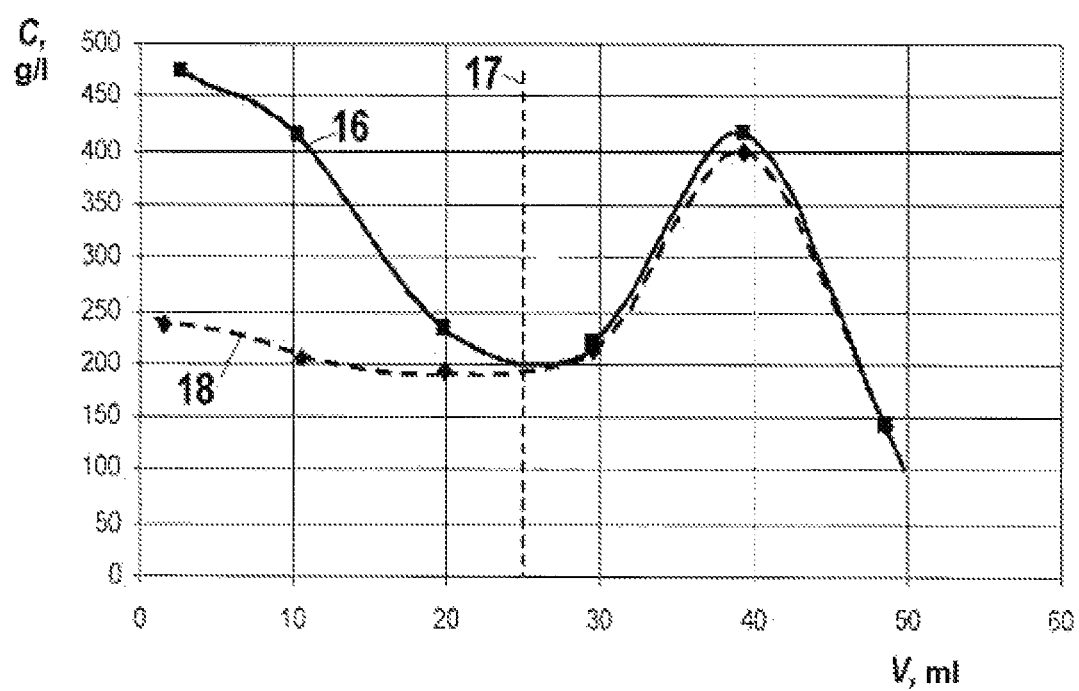
FIG. 5, relating to the Example 11, shows output diagram of total concentration of iodine in all forms, in the implementation of ion-exchanging process of alkaline desorption of iodine from anion exchange resin in the technology of iodine extraction from hydro-mineral raw materials in accordance with the proposed method.

C. Alkali solution in the amount of 48 ml 4.4 M (NaOH, 176 g/l) is transmitted through the column at a speed of 0.2 ml per minute, in the top-down direction, selecting cuts from the test tubes in the amount of 4 ml and analyzing its iodine content. The output diagram of iodine is shown on the FIG. 5 (diagram 16). It has a complicated structure: at first, it drops from the total concentration of all forms of iodine as 470 g/l to the minimum concentration of 200 g/l; after that, it reaches maximum again, which corresponds to the concentration of 420 g/l.

This fact is explained by disproportionate reaction, whereby, in the process of iodine desorption by alkali, an iodate is forming, which is weakly retained on the ion exchange resin, as well as strongly retained sodium iodide:

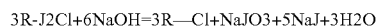

3R-J2Cl+6NaOH=3R—Cl+NaJO3+5NaJ+3H2O

A segment of the line 17 divides the output volume of iodine concentrate from the column into two zones; the first of which is enriched with sodium iodate (against the background of sodium iodide), and the second zone consists mainly of sodium iodide.

D. Decanol is displaced out of the layer of ion exchange resin into the separating funnel by transmission of initial solution through the column in the bottom-up direction; decanol is separated and used in the next cycles of iodine desorption. All operations on iodine extraction under Items A, B, C are repeated.

E. After each experiment, test tubes with selected solution cuts are left for 2 hours, during which a spontaneous destruction of supersaturated solutions takes place, with precipitation and fall-out of crystals, and acquisition of equilibrium solutions, which content is shown on the diagram 18.

The difference between diagrams 16 and 18 corresponds to the crystallization of pure sodium iodate. Total quantity of the components, displaced out of the column in the course of desorption is 14.8 g per iodine. This corresponds to the degree of regeneration as 95%. After regeneration, anion exchange resin is transferred again in the R—Cl form.

F. Decanol is displaced out of column by previous transmission of brine through the column at a speed of 0.2 ml/min in the bottom-up direction; the output liquid from the column is collected into the separating funnel; decanol, used in the next operations is separated. All operations under Items A-F are repeated.

Example 12

Comparative

The process is carried out, as described in the Example 11, except for the fact, that decanol or some other liquid organic substance is not used. For that purpose, operations under Items A, C and E, described in the Example 11, are consecutively repeated.

Figure 6:
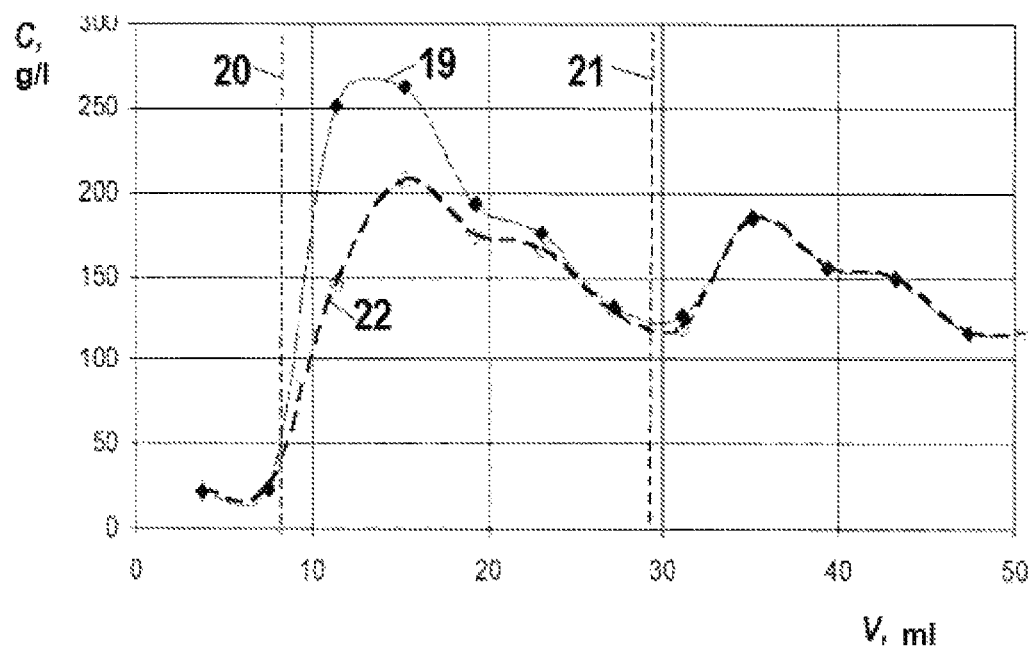
FIG. 6, relating to the Example 12, shows output diagram of total concentration of iodine in all forms, in the implementation of the same technology, as in the Example 11, but without filling of the space between granules of sorption material with liquid organic substances, prescribed by the proposed method.

The output diagram of iodine is shown on the FIG. 6 (diagram 19). The output solution cuts from the column correspond to the three zones, separated by segments of lines 20 and 21. At first, initial solution gets out of free space of the column in the first zone; the next zone, enriched with iodate, reaches its maximum, which corresponds to the total concentration of iodine as 270 g/l; in the next zone, which corresponds to the sodium iodide, concentration maximum corresponds to the value of 180 g/l. Diagram 22 shows the composition of equilibrium solutions after crystallization of sodium iodate from the supersaturated solutions in the selected cuts. The difference between diagrams 19 and 22 corresponds to the quantity of sodium iodate, obtained in the solid form, which is substantially lower than in the Example 11. Total quantity of the components displaced out of column in the course of desorption is 7.5 g per iodine. This corresponds to the regeneration degree of 48%, which implies that after the first cycle of regeneration anion exchange resin is transferred again in the R-JCl form. Thus, the process described in the given Example is twice less effective: only half of the anion exchange resin capacity is used in each cycle of it, as compared with the proposed method.

Example 13

In the application of the proposed method, the process for making of chlorine-free potassium fertilizers is modified (R. Khamizov, D. Muraviev, N. Tikhonov, A. Krachak, T. Zhiguleva, O. Fokina., Ind. Eng. Chem. Res., 1998, V37, No. 5, p. 1950-1955 [15]) with application of the phenomenon of isothermal supersaturation of solutions in the ion exchange [6, 7].

A. The cation exchange resin sample KU-2×8, produced in the commercial form, and swollen in the distilled water is transported in the ion-exchanging column, treated by transmission of 450 ml 1M of hydrochloric acid solution through it for preliminary transformation into H-form and removal of contaminating admixtures; it is washed by distilled water until neutral reaction removal); transferred into K-form by transmission of 450 ml 1M of KCl solution through the column, and washed by 300 ml of distilled water. The speed of solution transmission in the indicated processes is 10 ml/min.

Parameters of cation exchange resin KU-2 load, obtained in the potassium form are given in the Table 3.

TABLE 3

Parameters of cation exchange resin KU-2 load

| Feed rate, cm3 | Layer height, cm | Column section, cm2 | Free load free volume, cm3 | Load grain size, mm |
|---|---|---|---|---|
| 80 | 10.53 | 7.6 | 30 | 0.75 ÷ 1.00 |

B. Water from free (porous) space of the column is displaced and a layer of cation exchange resin KU-2 in the obtained K-form is filled with decanol.

For that purpose, decanol is transmitted though the column in the top-down direction until all of water (30 ml) is displaced out of column.

C. Ammonium sulfate in the amount of 90 ml and at the concentration of 247.5 g/l (that corresponds to the equivalent concentration of 3.75 g-ppm is transmitted through the column in the top-down direction, at a speed of 3.6 ml/min, collecting cuts in the amount of 10 ml. The resulting solutions are left to sediment during the time of the next operation (Item D). At the same time, crystallization of potassium sulfate from the supersaturated solutions takes place.

D. Potassium chloride solution in the amount of 90 ml and at the concentration of 188 g/l (that corresponds to the equivalent concentration of 2.5 g-ppm is transmitted through the column in the top-down direction, at a speed of 3.6 ml/min. At this moment, cation exchange resin is transferred back into K-form. The output ammonium chloride solution from the column is collected into separate tank.

E. Suspension cuts of potassium sulfate crystals in the equilibrium solutions of ammonium sulfate and potassium sulfate, obtained after operations under Item C, are consequently filtrated through paper filter; crystals are separated and dried; filtrates are combined into a single solution and diluted with water and solid ammonium sulfate, so that to obtain 90 ml of solution with ammonium sulfate content of 3.75 g-ppm, which is used in the next operation.

F. Operations under Items C-E are repeated to perform the next cycles for potassium sulfate.

The collected solution of ammonium chloride, obtained in accordance with the operation under Item D, can be transformed into easily recyclable sodium chloride by conventional ion-exchanging technique with application of sodium sulfate; and the obtained solution of ammonium sulfate can be returned into the process.

Figure 7:
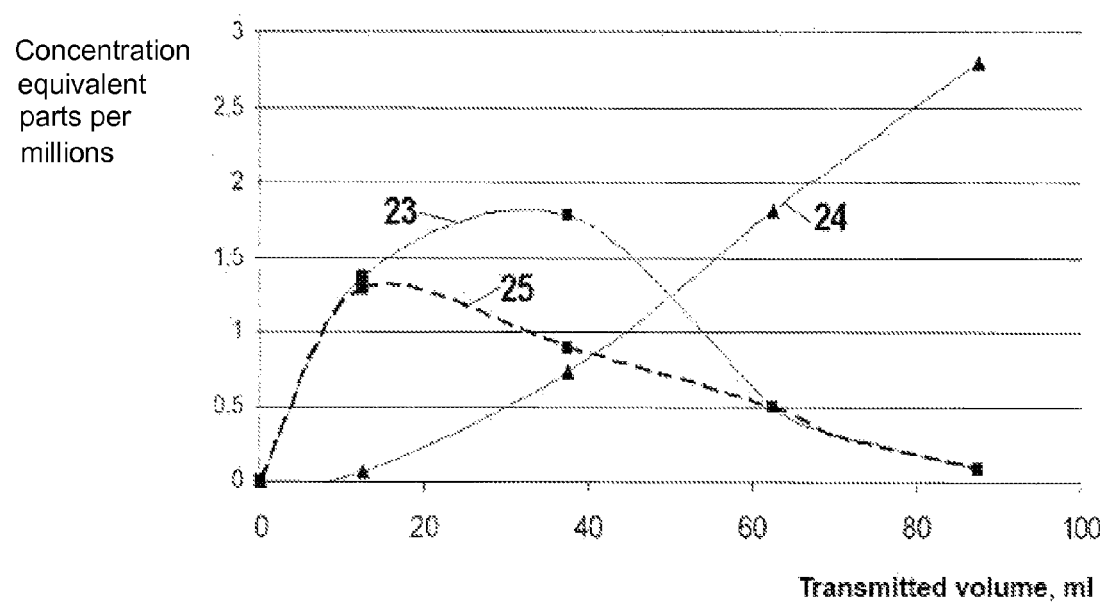
FIGS. 7 and 8, relating correspondingly to the Examples 13 and 14, show output diagrams of ammonium ion sorption and potassium ion desorption from the potassium form of cation exchange resinin the ion-exchanging technology of chloride-free potassium fertilizers, with application of the proposed method at different concentrations of processed solution.

Replica results are received, starting from the second cycle of repeated operations under Items C-E. Output diagrams of the components corresponding to the third cycle of process implementation in accordance with the Item C are shown on the FIG. 7. Diagram 23 corresponds to the total concentration of potassium ion in the cuts of supersaturated solutions coming out of columns; diagram 24 corresponds to the concentration of ammonium ion; and diagram 25—to the potassium ion concentration in the equilibrium solutions after crystallization of potassium sulfate.

There is no overrun of ammonium sulfate in the process; after each cycle of potassium desorption, its residual solution is additionally-reinforced with ammonium sulfate, which amount exactly equals to the amount of received hard potassium sulfate, and is used in the cycle.

In each cycle of the described process, starting with the second cycle, 2.5 g (28 mg-eq) of crystalline potassium sulfate is obtained.

Example 14

The process is performed as described in the Example 13, except for the fact, that in the implementation of operation under Item C 65 ml of ammonium sulfate solution is used with the concentration of 316.8 g/l (this corresponds to the equivalent concentration of 4.8 g-ppm.

Figure 8:
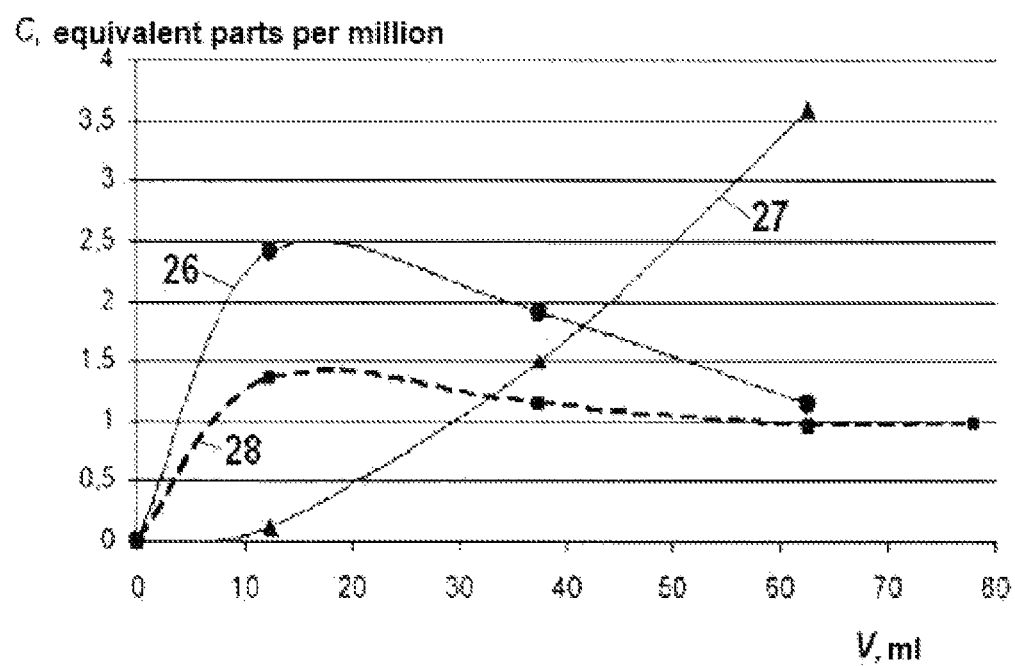

FIG. 8 shows output diagrams of the components, corresponding to the third cycle of operation implementation in accordance with the Item C. Diagram 26 corresponds to the total concentration of potassium ion in the cuts of supersaturated solutions coming out of columns; diagram 27 corresponds to the concentration of ammonium ion; and diagram 28—to the concentration of potassium ion in the equilibrium solutions after crystallization of potassium sulfate.

In each cycle of the described process, starting with the second cycle, 3.5 g (40 mg-eq) of crystalline potassium sulfate is obtained.

The proposed method in accordance with the described Examples 11, 13 and 14 allows implementation of the processes using the phenomenon of isothermal supersaturation of solutions in the ion exchange, providing steady stabilization of supersaturated solutions in the layer of sorption material in the wide range of concentration of chemical agents. This provides an advantage over methods, described in the works [6, 7, 13], in which the process can be implemented in narrow ranges of concentration of chemical agents in the solutions.

Figure 9:
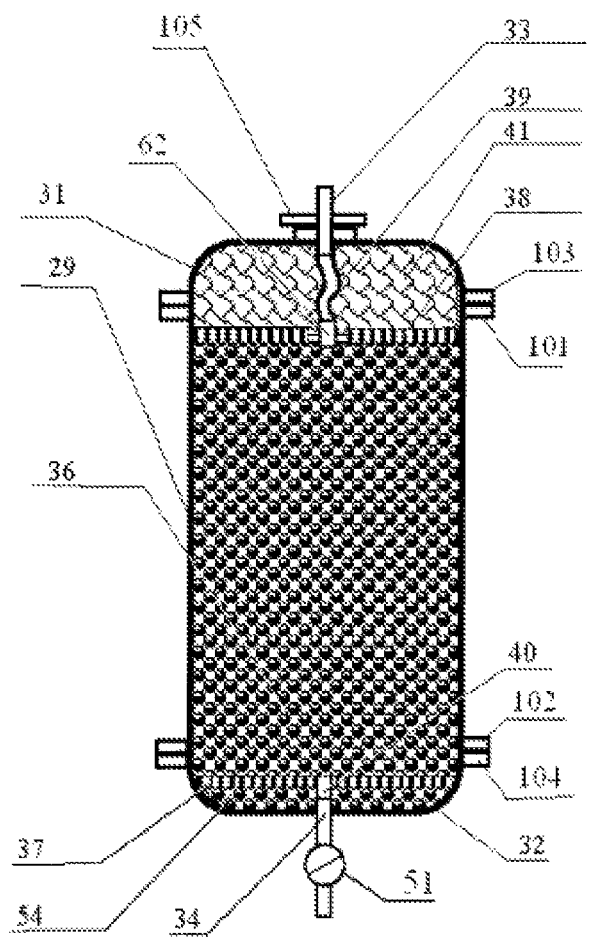
FIG. 9-11 show some possible modifications of the proposed apparatus for the implementation of mass transfer sorption processes, which differ by the designing of pressurization unit:
  on the FIG. 9—in the form of a layer of elastic material;
  on the FIG. 10—in the form of a disk and coiled spring;
  on the FIG. 11—in the form of hydraulic or air piston.

FIG. 9 schematically shows a section of the proposed mass transfer sorption apparatus. This apparatus contains a vertical cylindrical housing with cover 31, bottom 32 and a wall 29. Upper 38 and lower 37 drainage-distributional systems are installed correspondingly in the upper and lower parts of the housing. Upper 33 and lower 34 brunch tubes, installed correspondingly in the cover and bottom of the housing, are designed to supply and remove liquid from the apparatus, and are hydraulically connected correspondingly with upper and lower drainage-distributional systems 38, 37. Layer 36 of granular sorption material is placed between lower and upper drainage-distributional systems 38, 37. The space between granules is filled with liquid organic substance or a mixture of such substances, which does not mix either with water, or with processed aqueous solution, and does not chemically interact either with the components of processed aqueous solution, or with granular sorption material.

The upper drainage-distributional system 38 is installed and hydraulically connected with the upper brunch tube 33, allowing its movement in the vertical direction. In the free space between it and the housing cover a pressurization unit is placed, intended for the action over this system in the vertical direction.

In the case of implementation, shown on the FIG. 9, the indicated hydraulic connection is performed with a flexible tube 39; layer 41 made of a single or several pieces of hard foam rubber is used as a pressurization unit. Pressurization unit generates pressure in the layer of sorption material around 0.1 bars that prevents fluidization of sorption material and provides contact between its granules.

Lower brunch tube 34 is equipped with a faucet 51, which prevents leaking of the apparatus, when it is not attached to the main feed lines of liquid supply and removal.

Figure 11:
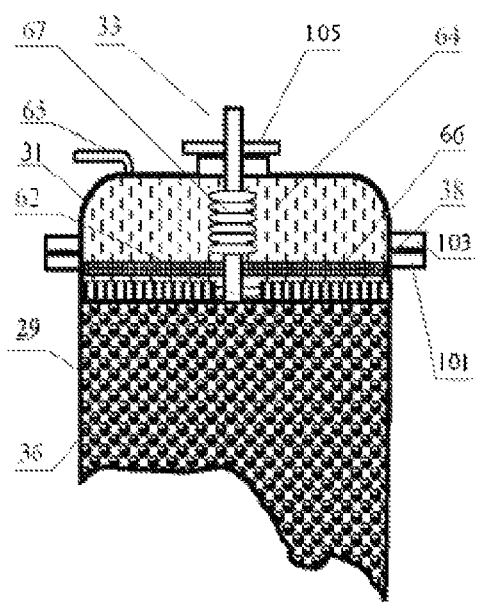

Hydraulic connection between upper drainage-distributional system 38 and upper brunch tube 33 can also be implemented with bellows 67 (this implementation is shown on the FIG. 11).

The indicated organic liquid substances or a mixture of such substances, which fill the space between granules of granular sorption material, can be of lower density than that of water, or higher density than that of the processed solution. In the first case, the upper brunch tube 33 is an input of the apparatus and the lower brunch tube 34 is an output one; in the second case—on the contrary, the lower brunch tube 34 is an input, and the upper brunch tube is an output.

Each of drainage-distributional systems 37, 38 can be made in the form of horizontal radiating drainage elements for the input and output of liquid, connected with one and the same central vertical brunch tube (40, 62). Each drainage element (it is not shown on the schemes) can be designed as a tube with holes, impermeable for granular sorption material or closed by slotted screen, impermeable for this material. Each drainage element can also be designed as a cylinder with walls made of porous material with pores, impermeable for granular sorption material.

In the case of apparatus designing, shown on the FIG. 9, the space between lower drainage-distributional system 37 and a bottom 32 of the housing is filled with neutral granular material 54, e.g. with gravel, of larger granule size, than that of granular sorption material 36.

This unit can be assembled of cylindrical housing, open form both sides, with flanges 101, 102, a cover 31 and a bottom 32 with flanges 103, 104; the cover 31 can be equipped with a hatch 105, as it is shown on the FIG. 9. Additional hatches (not shown on the scheme) for loading and unloading of the granular material, as well as inspection hatch, can be installed in the wall 29 of the housing.

Figure 10:
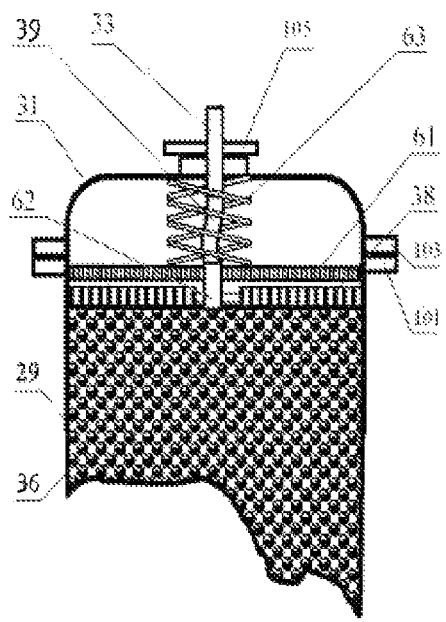

Sections in the upper part of the apparatus, designed for the implementation of mass transfer sorption processes, in two other cases of designing of pressurization unit are shown schematically on the FIGS. 10 and 11. On the FIG. 10 this means is designed in the form of a coiled spring 63, surrounding a flexible tube 39 and thrusting by one end against cover 31 of the housing, and by the other end—against disk 61, installed above upper drainage-distributional system 38. On the FIG. 11 pressurization unit is designed as a piston 66, installed in the housing. In this case, free space above piston 66 shall be connected by additional brunch tube 65 with the source of gas or liquid under controlled pressure. Hydraulic connection of the upper drainage-distributional system 38 with upper brunch tube 33 in the case, shown on the FIG. 11 is performed through bellows 67.

In the use of this apparatus for the implementation of mass transfer sorption processes, the processed aqueous solution is supplied at the input of the apparatus, e.g. in the upper brunch tube 33, provided that organic liquid, filling the space between sorbent granules, is of lower density, than that of water. This solution, as it is shown on the FIG. 1, is supplied in the inter-phase boundary between organic liquid 1 and the surface of sorbent granules 2, forming a finest film 3. The film is coating each sorbent granule and flows down along the points of contact between granules. Components of the solution, transmitted from the top and that do not detain on the sorption material are the first to come out of the devise output, which is the lower brunch tube 34 with faucet 51, installed on it. After that, water is supplied into the apparatus input and sorption material is washed from detained components of the processed solution. At this stage, these components come out, displaced out of apparatus.

Similar processes take place at the supply of the processed solution and water in the bottom-up direction, i.e. through the lower brunch tube 34 with the faucet 51. In this case brunch tube 33 is the output of the apparatus.

The above described proposed apparatus for the implementation of mass transfer sorption processes can be used as a part of the proposed industrial plant for the component separation of aqueous solutions of inorganic substances, as well as an apparatus for the separation of liquid organic substances from aqueous solutions.

Figure 12:
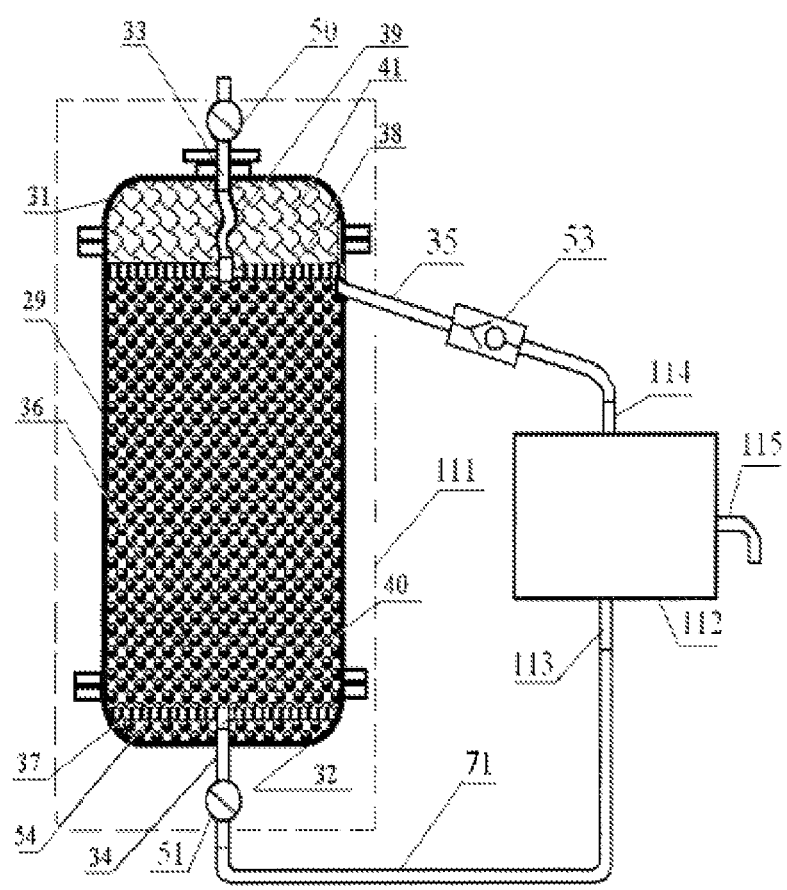
FIGS. 12 and 13 show the proposed industrial plant for the component separation of aqueous solutions of inorganic substances in cases of its implementation, different by directions of the processed aqueous solution or water supply; containing the proposed apparatus for mass transfer sorption processes and an apparatus for the separation of liquid organic substances from aqueous solutions.
Figure 13:
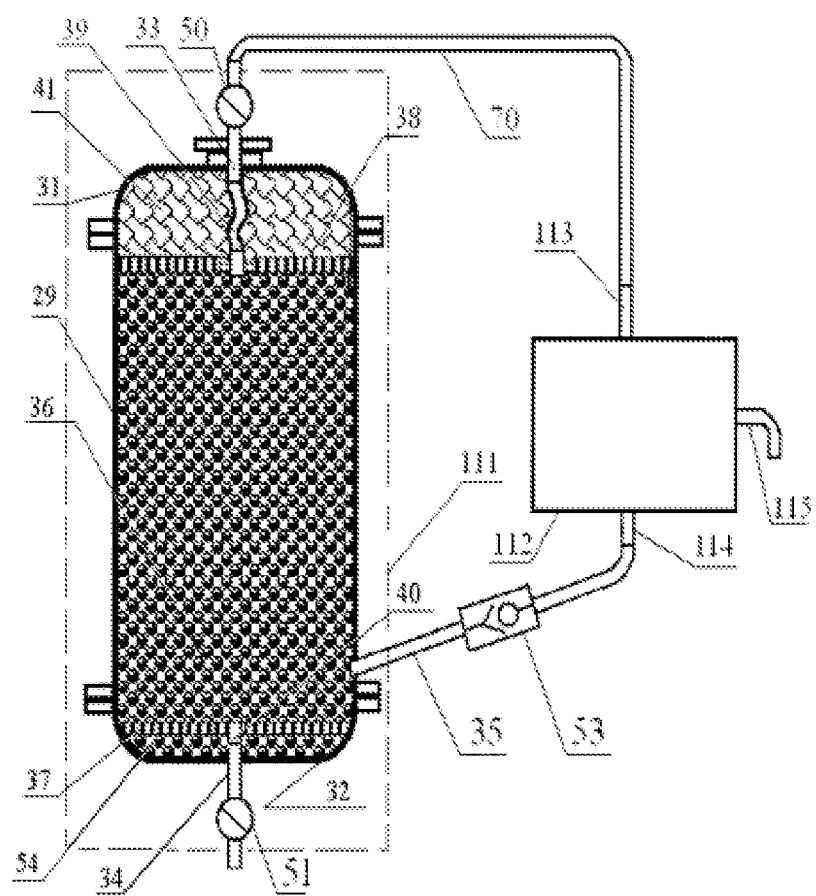

The proposed industrial plant, shown on the FIG. 12 and FIG. 13, contains an apparatus 111 for the implementation of mass transfer sorption processes, connected with the apparatus 112 for the separation of liquid organic substances from aqueous solutions by the line in the form of a tube 35 and by the tube 71 (FIG. 1), or by the tube 70 (FIG. 13). Circulating pump 53 with return valve is installed in the indicated line. FIGS. 12 and 13 illustrate designing of the plant in the general case, at the use of any apparatus 112 for the separation of aqueous solutions from liquid organic substances that do not blend with it, acceptable by its productivity and performance. As such apparatus may be used, for example, apparatus of the pointed function, made on the basis of the apparatus known under the USSR Inventor's Certificate [11], [12] or Russian Federation Patents No 2048644 (publ. Nov. 20, 1995) [16], No 2077363 (publ. Apr. 20, 1997) [17].

A more preferable designing of the apparatus 112, which shall be used in this proposed industrial plant for the separation of liquid organic substances from aqueous solutions in accordance with the proposed invention, relating to such apparatus, will be described below.

Cases of designing of the proposed plant shown on the FIGS. 12 and 13 differ only by the method of connection of the apparati 111 and 112.

In both cases presented on these figures the mass transfer sorption apparatus 111 contains vertical cylindrical housing with cover 31, bottom 32 and a wall 29. Upper 38 and lower 37 drainage-distributional systems are installed correspondingly in the upper and lower parts of the housing. Upper 33 and lower 34 brunch tubes are installed correspondingly into the cover and bottom of the housing, which are designed for liquid supply or drainage, and hydraulically connected with upper and lower drainage-distributional systems 38, 37 respectively. A layer of granular sorption material 36 is placed between lower and upper drainage-distributional systems 38, 37. The space between granules is filled with liquid organic substances or a mixture of such substances, which does not mix either with water, or with the processed aqueous solution, and does not chemically interact either with the components of processed aqueous solution, or with granular sorption material. The upper drainage-distributional system 37 is installed and hydraulically connected with upper brunch tube 33, allowing its movement in a vertical direction. There is free space between it and the housing cover 31, where a pressurization unit is placed, designed for the action over this system in a vertical direction. The indicated hydraulic connection is set up by a flexible tube 39, and layer 41, made of a single or several pieces of hard foam rubber, is used as a pressurization unit. The pressurization unit generates pressure in the layer of sorption material around 0.1 bars, which prevents fluidization of sorption material and provides contact between its granules. The space between lower drainage-distributional system 37 and a bottom 32 of the housing 29 of the apparatus 111 for the implementation of mass transfer sorption processes is filled with neutral granular material 54 in the form of gravel of larger granule size, than that of granular sorption material in the layer 36. Apparatus 111 is equipped with faucets 50, 51, installed correspondingly on the upper 33 and lower 34 brunch tubes.

Apparatus 112 for the separation of liquid organic substances from aqueous solutions has an input 113, the first 114 and the second 115 outputs. The first output 114 is an output of this apparatus, intended for the liquid organic substances to be separated; the second output 115 is an output of the indicated apparatus, intended for aqueous solution, cleared of liquid organic substances, as well as an output of the entire proposed industrial plant.

Connection of the apparatus 111 with the apparatus 112 is set up by the tube 71 (FIG. 12) or a tube 70 (FIG. 13) between output brunch tube of the apparatus 111 and an input 113 of the apparatus 112; as well as by the line in the form of a tube 35, one end of which is connected with the first output 114 of the apparatus 112, and the other is installed into the housing wall 29 of the apparatus 111, near the upper drainage-distributional system 38 (FIG. 12) or near the lower drainage-distributional system 37 (FIG. 13) so that this end was directly connected with the layer of sorption material. Circulating pump 53 with return valve is installed on the indicated line. In this case, in the industrial plant shown on the FIG. 12, brunch tube 34, with an installed faucet 51 is an output brunch tube of the apparatus 111; and in the plant shown on the FIG. 13—brunch tube 33, with installed faucet 50. Correspondingly, brunch tube 33 is an input brunch tube of the apparatus 111 and of the entire unit under FIG. 12; and brunch tube 34—of the unit under FIG. 13 and an apparatus 111 used in it.

The described differences in the structures of the units under FIG. 12 and FIG. 13 are explained by the fact that they correspond to different correlations between densities of liquid organic substances used in the mass transfer sorption apparatus, and densities of the processed solution or water. In the unit under FIG. 12 density of the indicated substances shall be lower, than that of water (and consequently, lower than density of the processed solution); and in the unit under FIG. 13 density of the indicated substances shall be higher, than that of processed solution (and consequently, higher than density of water). That's why processed solution and water in the unit under FIG. 12 are supplied through the apparatus 111 in the top-down direction; and in the unit under FIG. 13—in the bottom-up direction.

Operation of the apparatus 112 in the units under FIG. 12 and FIG. 13 allows cleaning of the emulsion, coming out of the apparatus 111 from liquid organic substances, which fill the layer of sorption material in this apparatus and capable of penetrating into its output; and provides obtaining of the components of the processed aqueous solution, cleared of the indicated substances, at the output 115 of the proposed unit. At the same time liquid organic substances are returned into the mass transfer sorption apparatus through the first output 114 of the apparatus 112 and a tube 35 with circulating pump 53 with return valve that allows preserving properties of the sorption material layer, in which space between granules shall be filled with the indicated liquid organic substances. Circulating pump 53 is much less productive than the main pumps, which supply the processed solution and water into the mass transfer sorption apparatus.

Figure 14:
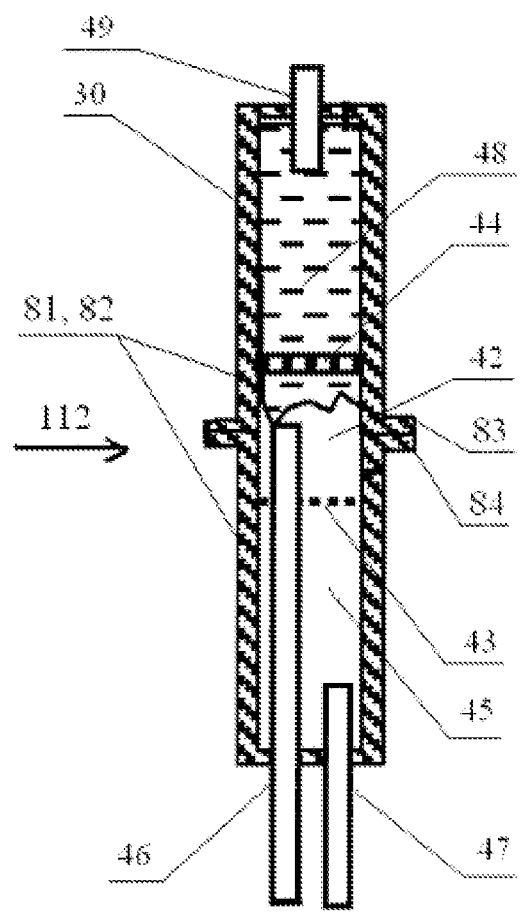
FIG. 14 shows the proposed apparatus for the separation of liquid organic substances from aqueous solutions.

Designing of the apparatus 112 for the separation of liquid organic substances from aqueous solutions in accordance with the proposed invention is illustrated on the FIG. 14.

This apparatus has a housing 30, made in the form of a vertical cylinder with closed ends, which contains two outer chambers 45, 48, adjusting to ends, and a middle chamber 42 placed between them. The latter is separated from one of the outer chambers by a grid 43, designed for prevention of turbulence; and from the other—by hydrophobic drainage layer 44, permeable for liquid organic substance to be separated; but impermeable for water and purified aqueous solution.

Input brunch tube 46, which goes through the indicated outmost chamber 45 and a grid 43 into the middle chamber 42 and reaches, at least, its mid-point; as well as the second output brunch tube 47, reaching no more than a mid-point of the indicated outmost chamber 45, are installed into the end of the outmost chamber 45 (lower one on the FIG. 14), separated from the middle chamber 42 by a grid 43. The first output brunch tube 49 is installed into the end of the other outer chamber 48 (upper one on FIG. 14), separated from the middle chamber 42 by hydrophobic drainage layer 44, and reaches no more than a mid-point of this chamber. Insertion of the input brunch tube directly into the middle chamber 42 through the side wall of the housing 30 is a solution, equivalent to the described above.

Housing 30 can be designed in the form of two glasses 81, 82 connected by flanges 83, 84.

Hydrophobic drainage layer 44 of the given apparatus can be designed in the form of a disk with holes made of water-proof material, as it is shown on the FIG. 14; or in the form of a layer of granules, made of water-proof material, previously treated with liquid organic substances, identical to those, which shall be separated. PTFE or carbon-omental gland material can be used as the indicated water-proof material.

The input brunch tube 46 is an input of the proposed apparatus for the emulsion to be separated; the first output brunch tube 49 is an output for the liquid organic substances to be separated; and the second output brunch tube 47 is an output of aqueous solution, cleared of liquid organic substances. Connection of the proposed apparatus for the separation of liquid organic substances from aqueous solutions with the proposed mass transfer sorption apparatus, as a part of the proposed industrial unit, is shown on the FIG. 15 and FIG. 16. This connection is analogous to the connection with any acceptable apparatus 112, shown on the FIG. 12 and FIG. 13, designed for the separation of liquid organic substances from aqueous solutions. The input brunch tube 46 of the apparatus 112, shown on the FIG. 14-16 corresponds to the input 113 of the apparatus 112, shown on the FIG. 12, 13; output brunch tube 49 corresponds to the output 114; output brunch tube 47 corresponds to the output 115, which is an output of the entire industrial unit, shown on the FIGS. 15 and 16 (the same correspondence is shown on the FIG. 17-24, which will be described below in the Examples 15 and 16).

Figure 15:
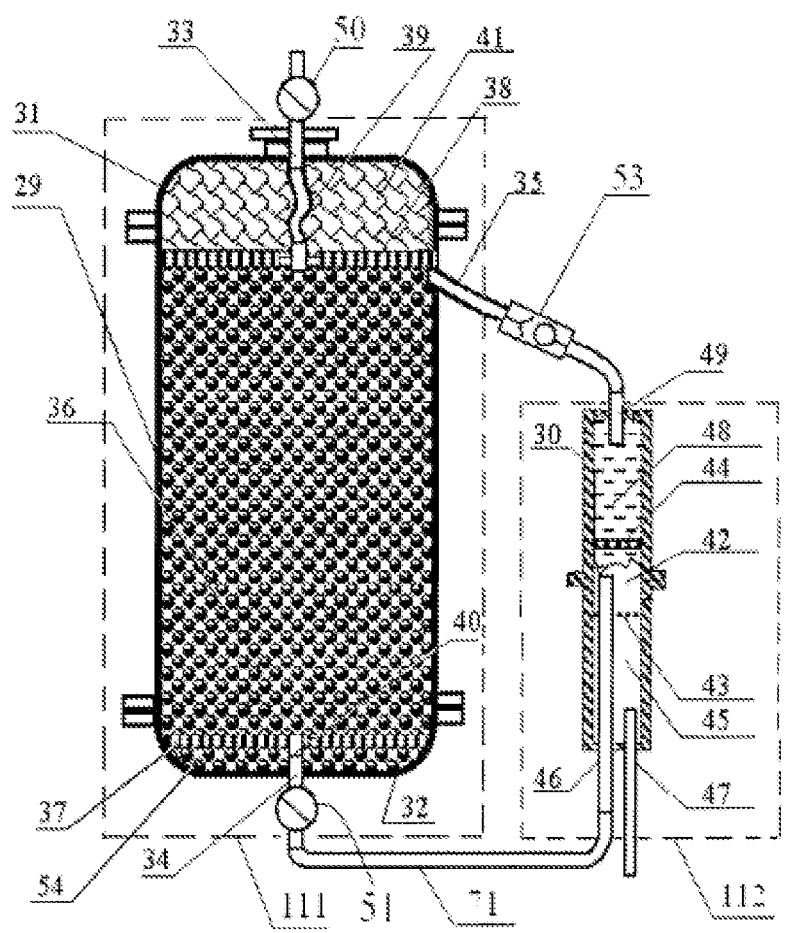
FIGS. 15 and 16 show the same, as on the FIGS. 12 and 13, provided that the apparatus, used as a part of the proposed industrial plant, for the separation of liquid organic substances from aqueous solutions, is made in accordance with the proposed invention, relating to such apparatus.

Apparatus 112 for the separation of liquid organic substances from aqueous solutions shown on the FIG. 14, has the same designing, as when it is used as a part of the unit under FIG. 15. For various reasons, such as high speed of transmission of the processed aqueous solution through the apparatus 111, a certain amount of organic liquid can be displaced out of this apparatus, and reach the middle chamber 42 of the apparatus 112 through the tube 71 and output brunch tube 46. The grid prevents swirling of the inlet emulsion flow that might cause penetration of organic liquid into the outmost chamber with the second output brunch tube; and a hydrophobic drainage layer prevents penetration of aqueous solution into the outmost chamber with the first output brunch tube. If there was no grid 43 to separate middle chamber 42 from the lower (FIG. 14, 15) chamber, organic liquid, due to swirling of the flow, and irrespective of the fact that, it has lower density, could get into the second output brunch tube 47 along with purified aqueous solution. The grid 43, designed for prevention of such turbulence, excludes such a possibility. Therefore, organic liquid from the middle chamber 42 can only emerge and penetrate into the upper (FIG. 14, 15) chamber 48 through hydrophobic drainage layer 44 and get further into the apparatus 111. Hydrophobic drainage layer 44 is permeable for organic liquid, but impermeable for water and aqueous solutions. That's why the processed solution cannot penetrate into the apparatus 112 through the tube 35, and reaches it only after passing through the layer 36 of sorption material and a tube 71; after that, it leaves the apparatus 112 through its second output brunch tube 47, previously sinking through the grid 43 into the lower (FIG. 14, 15) chamber 45. The set forth material is sufficient to understand operating principles of the apparatus 112; even in it's another designing, as a part of the industrial plant, shown on the FIG. 16.

Functioning and designing of the apparatus 112, as a means of separation of insoluble aqueous solutions and organic liquids in other possible cases of its application (not as a part of the proposed industrial unit) are analogous to those, described above, and depend only on the correlation of densities of the separated aqueous solution and organic liquid.

Figure 16:
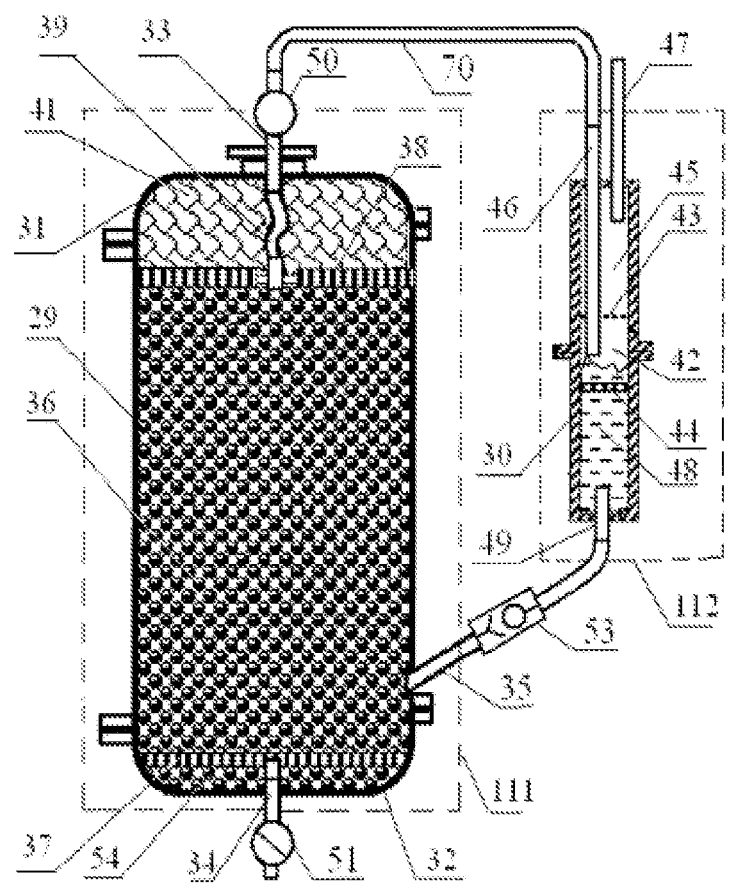
Figure 17:
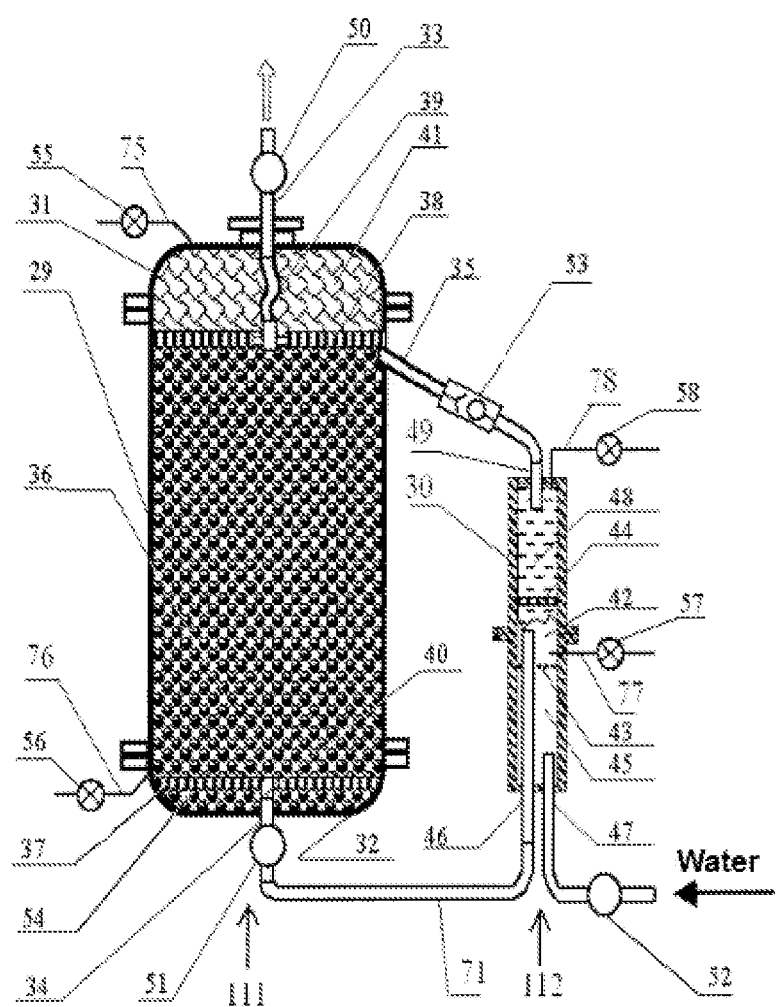
FIG. 17-20 and FIG. 21-24, relating correspondingly to the Examples 15 and 16, show operation of the proposed industrial plant by FIGS. 15 and 16, and control of it on different stages of the production process.
Figure 18:
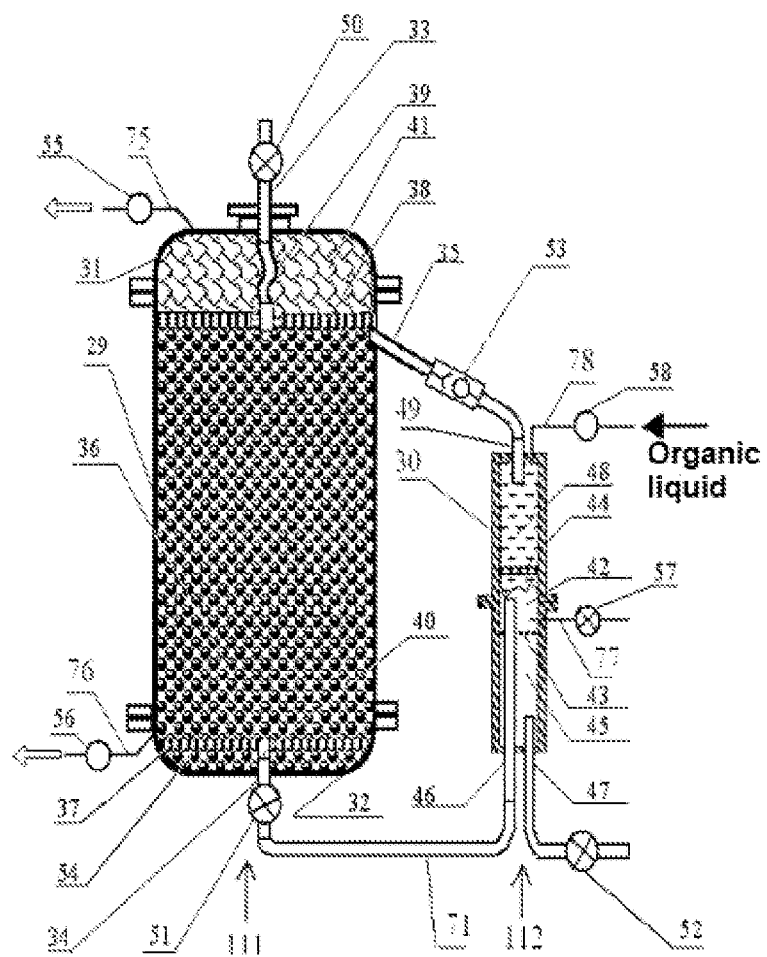
Figure 19:
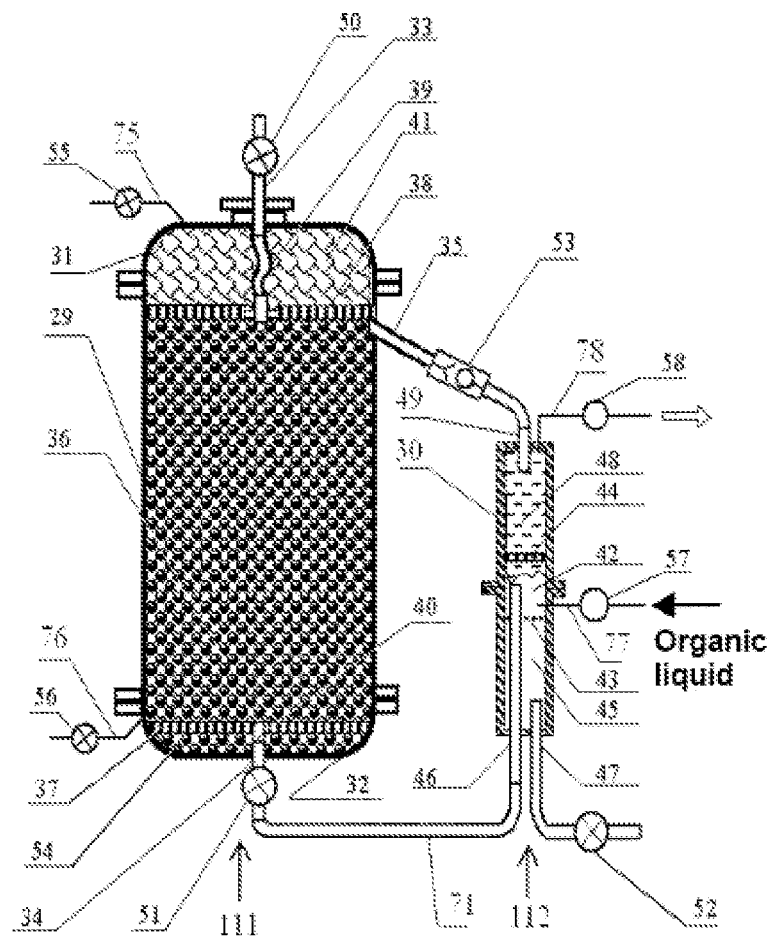
Figure 20:
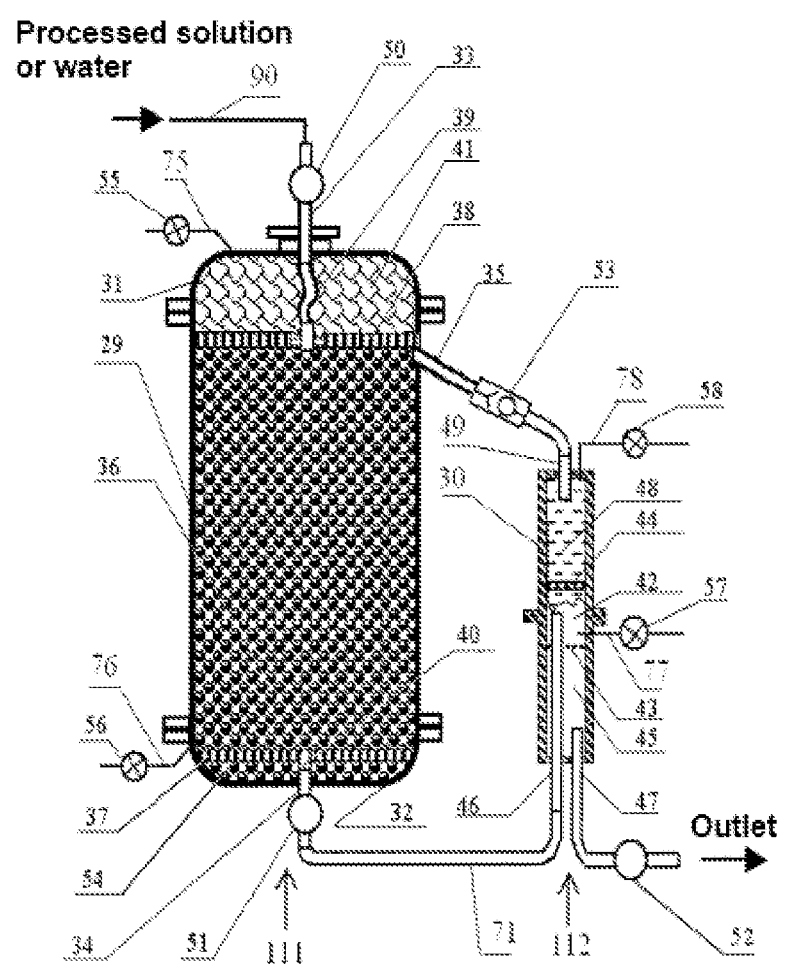
Figure 21:
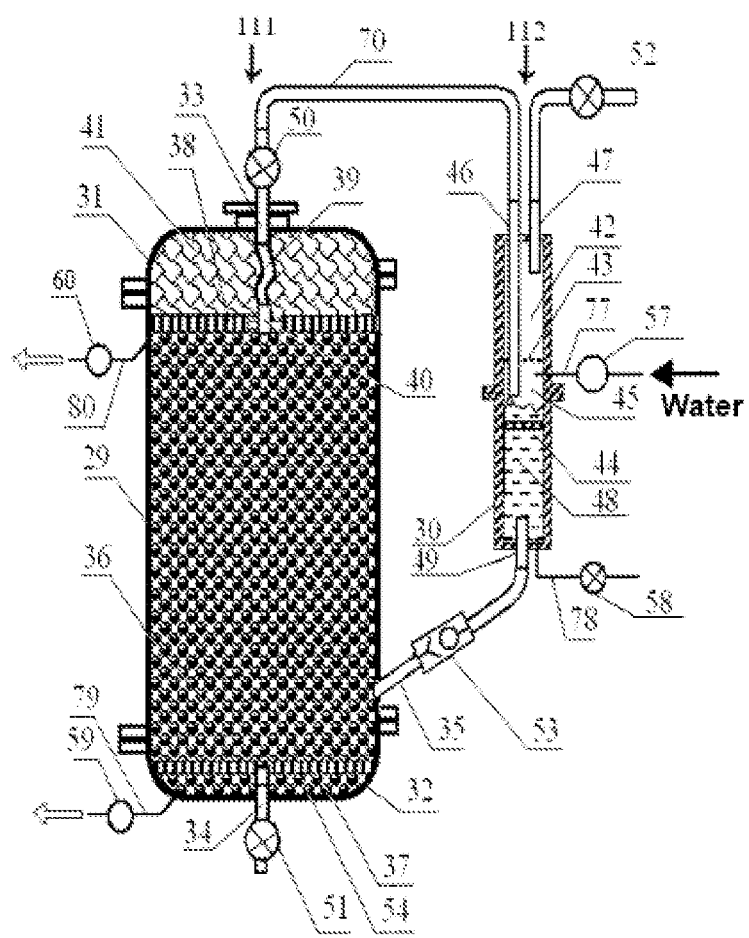
Figure 22:
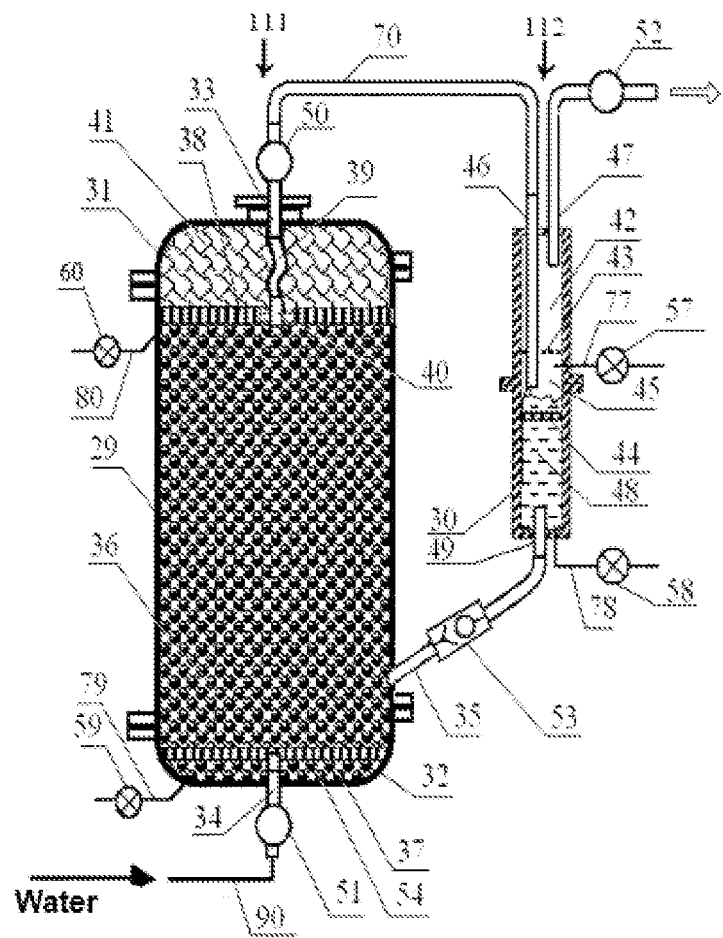
Figure 23:
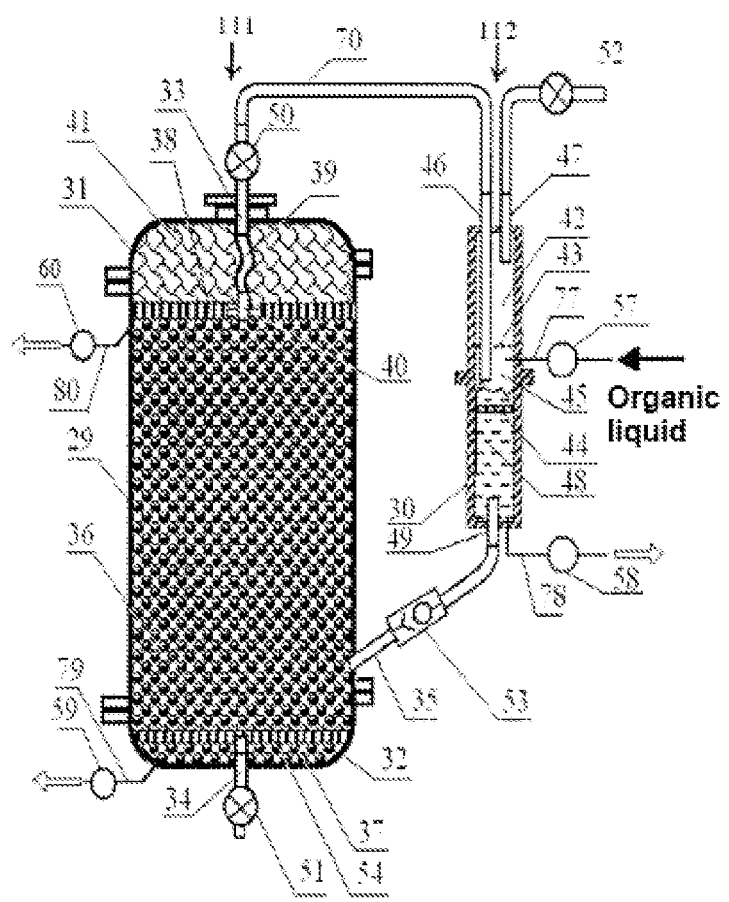
Figure 24:
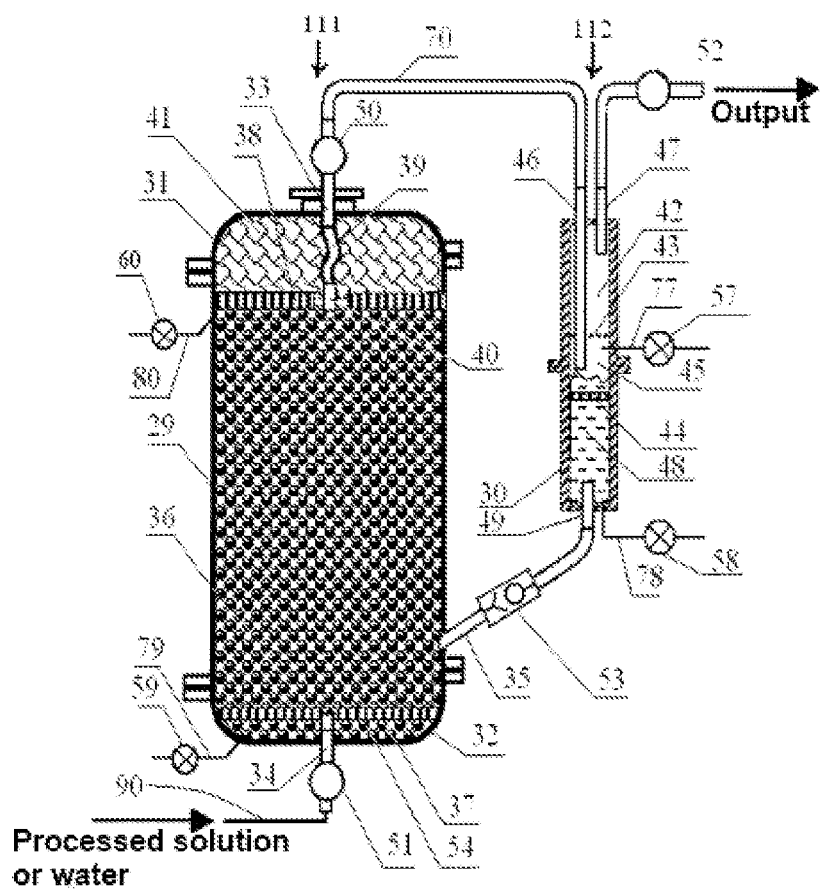

In the Examples 15 and 16, given below, the proposed method and industrial unit are used for the implementation of sorption processes of treatment of the solution of acid leaching of nepheline concentrate which is a concentrated solution of a mixture of aluminum nitrate, sodium and nitric acid, as in the Example 1. The plant, shown on the FIGS. 15 and 16, is used; in the apparatus, apparatus 111 of which, for the implementation of mass transfer sorption processes, the required volume of anion exchange resin layer in the nitrate form in the most swollen condition, i.e. in the pure water media is 1200 liters. Total capacity of the apparatus 112 for the separation of liquid organic substances from aqueous solutions is 250 liters.

Operation of the proposed plant is illustrated in the Examples 15 and 16, starting from the preparation processes, at the implementation of which auxiliary brunch tubes and faucets are used, shown on the FIG. 17-24, relating to different stages of preparation and operation of the unit.

Faucet 52 is installed on the output brunch tube 47. Faucets 57 and 58 are installed on the brunch tubes 77 and 78, inserted correspondingly into the wall of middle chamber 42 and into the end of the outmost chamber 48, separated from the middle chamber 45 by hydrophobic drainage layer 44 of the apparatus 112. Brunch tubes 75, 76 with faucets 55, 56 are inserted correspondingly into upper part of the cover 31 and into the wall 29 of the housing, directly above lower drainage-distributional system 37 of the apparatus 111. Faucets 55, 56 are used only in the unit under Example 15 (FIG. 17-20). Brunch tubes 79, 80 with faucets 59, 60 are inserted correspondingly into the lower part of the bottom 32 and into the housing wall 29, directly under the upper drainage-distributional system 38 of the apparatus 111. Faucets 59, 60 are used only in the unit under Example 16 (FIG. 21-24). On the FIGS. 17-24, running faucets are indicated with white circle and the turned off faucets—by crossed circle.

Example 15

Water and Processed Solution are Supplied into the Proposed Unit in the Top-Down Direction A. The first prior operation is carried out to fill the unit with pure desalinated water, displacing air from the apparatus 111, 112 and connection pipelines 35 and 71. For that purpose (see FIG. 17), water pump shall be connected to the brunch tube 47, which is equipped with faucet 52; faucet 51 on the brunch tube 34 and faucet 50 on the brunch tube 33 shall be running Faucets 55-58 on the brunch tubes 75-78 shall be turned off. Faucet 52 on the brunch tube 47 shall be running; the pump shall be switched on, and water is supplied into the unit at the flow rate of 1000 liters per hour.

In the emergence of water from the brunch tube 33 with faucet 50 (emergence of water or inorganic liquid on the FIG. 17 and the following figures is indicated with white arrows) the pump is switched off, the faucet 52 on the brunch tube 47 is turned off.

B. The second prior operation is carried out for filling of the unit with the required volume of organic liquid-peralgonic acid. For that purpose (see FIG. 18) previously turned on faucets 50 and 51 are turned off; brunch tube 78 with faucet 58 is connected to the outer pump of organic liquid supply, faucets 55 and 56 on the brunch tubes 75 and 76 are tuned on. After that, having turned on the faucet 58 on the brunch tube 78, pump is switched on and organic liquid is supplied at a rate of 1000 l/h.

At first, water is suppressed out of the unit. When organic liquid reaches the faucet 55 on the brunch tube 75, this faucet is turned off. When organic liquid reaches the faucet 56 on the brunch tube 76, the pump is switched off; this faucet and a faucet 58 on the brunch tube 78 are turned off.

After that, the pump for organic liquid supply is connected to the brunch tube 77 with faucet 57 (see FIG. 19), this faucet is turned on, the faucet 58 on the brunch tube 78 is turned on again and the pump is switched on.

At first, organic liquid comes out of brunch tube 58, then water and organic liquid emulsion, then again organic liquid. After that, the pump is switched off; faucet 58 on the brunch tube 78 and faucet 57 on the brunch tube 77 are turned off, and the pump is disconnected.

After that, line 90 for the processed solution and water supply is connected to the brunch tube 33 with a faucet 50; faucet 51 on the brunch tube 34, faucet 52 on the brunch tube 47, and faucet 50 on brunch tube 33 are turned on. As a result, the faucets are in the condition, shown on the FIG. 20. The plant is ready for the implementation of cyclic methods of sorption-desorption.

It takes 575 liters of peralgonic acid to fill the unit. The indicated volume remains in the unit without loss throughout its operation period.

During described prior operations, pure liquids from the brunch tubes are directed into the corresponding source or storage tanks; emulsions are collected into separate tanks, separated into water and organic liquid after distilling; and the separated liquids are directed into the corresponding tanks.

Prior to commercial operation of the unit, after reaching its full operation, the productivity of circulating pump 53 with return valve is set so, that it shall be sufficient to return liquid organic substances into mass transfer sorption apparatus, apparatus 111, falling on its output. Automatic control of the circulating pump is available, during which it is switched on, when organic liquid gets into the outmost chamber 45 of the apparatus 112, separated from the middle chamber with a grid 43; and switched off when organic liquid gets into the outmost chamber 48, separated from the middle chamber with a hydrophobic layer 44. For that purpose, corresponding sensors shall be installed in the apparatus 112.

C. The solution of alkali leaching of nepheline concentrate, containing the following substances in the corresponding concentrations: $Al(NO_3)_3$—2.6 mole/l (553.8 g/l); $HNO_3$—1.3 mole/l (81.9 g/l); $NaNO_3$—0.92 mole/l (78.2 g/l) is supplied into the unit from the source solution tank by the pump, connected to the input line 90, provided that faucet 50 (FIG. 20) is running.

Supply rate is 1600 l/h. The operation duration is 1 hour, after that, the pump is switched off and initial solution supply is stopped. The first batch of the solution, coming out of the unit, which contains minimal amount of nitric acid, and namely 1250 liters, is supplied for further treatment to obtain alumina and mineral fertilizers. The next batch in the amount of 350 liters is returned in the beginning of the process for recycling.

D. Pure, desalinated water from the source tank is supplied into the unit by the pump of water supply, connected to the input line 90, provided that faucet 50 is running Supply rate is 1200 l/h. The operation duration is 1 hour, after that, the pump is switched off and water supply is stopped. The first batch of solution, coming out of the unit, and namely 150 liters is returned in the beginning of the process for recycling. The next batch in the amount of 1050 liters, which is a solution of nitric acid, is delivered to the customer for the preparation of working solution for leaching of nepheline concentrate.

E. All operations, enumerated under Items C and D are repeated.

The sorption process of treatment of the solution of alkali leaching of nepheline concentrate, using the proposed method and the plant with a single mass transfer sorption apparatus of the indicated scale, allows production of 15 m3 of liquid aluminum concentrate per day, almost without acid. Compared with direct alkali treatment, it reduces consumption: 25% of acid, 25% of alkaline and 50% of water.

Example 16

Water and Processed Solution are Supplied into the Proposed Unit in the Bottom-Up Direction A. The first prior operation is carried out to fill the unit with pure desalinated water, displacing air from the apparatus 111, 112 and pipelines 35 and 70, connecting these apparatus. For that purpose (see FIG. 21), water pump shall be connected to the brunch tube 77 with faucet 57; faucet 59 on the brunch tube 79 and faucet 60 on the brunch tube 80 are turned on; water is supplied into the unit at the flow rate of 1000 liters per hour. In the emergence of water from the brunch tube 79 with faucet 59 this faucet is turned off; in the emergence of water from the brunch tube 80 with faucet 60, the pump is switched off and this faucet is turned off.

After that (see FIG. 22), faucet 57 on the brunch tube 77 is turned off; the pump is disconnected and connected to the brunch tube 34 with faucet 51 through the line 90. Faucet 50 on the brunch tube 33, faucet 52 on the brunch tube 47 and faucet 51 on the brunch tube 34 are turned on. The pump for water supply is switched on. Water is supplied in the unit at a rate of 1000 liters per hour (see FIG. 22).

When water starts running without bubbles after faucet 52 on the output brunch tube 47, the pump is switched off and this faucet is turned off.

B. The second prior operation is carried out for filling of the unit with the required volume of organic liquid-cyclohexyl alcohol with the density of 1.47. For that purpose (see FIG. 23), previously turned on faucet 50 on the brunch tube 33 and faucet 51 on the brunch tube 34 are turned off. Brunch tube 77 with faucet 57 is connected to the outer pump of organic liquid supply; faucet 59 on the brunch tube 79 and faucet 60 on the brunch tube 80, as well as faucet 58 on the brunch tube 78 are turned on. After that, faucet 57 on the brunch tube 77 is turned on, and organic liquid is supplied at a rate of 1000 l/h.

In the emergence of organic liquid from the faucet 58 on the brunch tube 78, faucet 58 is turned off; in the emergence of organic liquid from the faucet 59 on the brunch tube 79, faucet 59 is turned off; in the emergence of organic liquid from the faucet 60 on the brunch tube 80, the pump is switched off, faucet 60 is turned off.

Faucet 57 on the brunch tube 77 is turned off. Line 90 for the processed solution and water supply is connected to the brunch tube 34 with faucet 51; faucet 50 on the brunch tube 33, faucet 52 on the brunch tube 47 and faucet 51 on the brunch tube 34 are turned on. As a result, the faucets are in the condition, shown on the FIG. 24.

The plant is ready for the implementation of cyclic methods of sorption-desorption. It takes 575 liters of cyclohexyl alcohol to fill the unit. The indicated volume remains in the unit without loss throughout its operation period.

Prior to commercial operation of the unit, after reaching of full operation, the productivity of circulating pump 53 with return valve is set similar to those, described in Example 15.

C. The solution of alkali leaching of nepheline concentrate of the composition, indicated in the Examples 1 and 15, is supplied into the unit from the source solution tank, by the pump connected to the line 90, which is attached to the brunch tube 34 with running faucet 51. Supply rate is 1500 l/h. The operation duration is 1 hour, after that, the pump is switched off and solution supply is stopped. The first batch of solution coming out of the unit, containing the minimum amount of nitric acid, and namely 1200 liters is supplied for further treatment to produce alumina and mineral fertilizers. The next batch, in the amount of 300 liters is returned in the beginning of the process for recycling.

D. Pure, desalinated water from the source water tank is supplied into the unit by the pump of water supply, connected to the line 90, which is attached to the brunch tube 34 with running faucet 51. Supply rate is 1200 l/h. The operation duration is 1 hour, after that the pump is switched off and water supply is stopped. The first batch of solution coming out of the unit, and namely 150 liters is returned in the beginning of the process for recycling. The next batch in the amount of 1050 liters, which is a solution of nitric acid, is delivered to the customer for the preparation of working solution for leaching of nepheline concentrate.

E. All operations, enumerated under Items C and D are repeated.

The sorption process of solution treatment of alkali leaching of nepheline concentrate, using the proposed method and plant with a single mass transfer sorption apparatus of the indicated scale, allows production of 13.8 m3 of liquid aluminum concentrate per day, almost without acid. Compared with direct alkali treatment, it reduces consumption: 25% of acid, 25% of alkaline and 50% of water.

INDUSTRIAL APPLICABILITY

Thus, the proposed method of mass transfer sorption processes, the apparatus for its implementation as a part of the industrial plant, which also includes the proposed apparatus for the separation of liquid organic substances from aqueous solutions, significantly enhance the efficiency of mass transfer sorption processes of component separation of aqueous solutions of inorganic substances, by the increase of the degree of separation in the processing of concentrated solutions, including highly acidic solutions, by means of stabilization of supersaturated solutions in the sorption layers, and by the increase of durability of the used sorption materials, without specifying special requirements to the size of sorbent granules and conditions of aqueous solution processing, including high pressure maintenance and the choice of certain directions of fluid flow.

Inventions can be used in the chemical industry, hydrometallurgy, ferrous and nonferrous metallurgy, galvanic industry, chemical analyses and other fields, where processes of dissolution and leaching are used, with the aim of further treatment of the obtained aqueous solutions.

INFORMATION SOURCE

1. Senyavin M. M. "Ion exchange in the technology and analyses of inorganic substances", Moscow, "Chemistry", 1980, p. 272.
2. B. A. Bolto, D. E. Weiss. In Ion Exchange and Solvent Extraction (Eds. J. A. Marinsky and Y. Marcus). Marsel Dekker, New York, 1977. P. 221.
3. Patent of Russian Federation No 2034651, publ. May 10, 1995.
4. M. J. Hatch, J. A. Dillon. Industrial and Engineering Chemistry Process Design and Development, 1963, V. 2, No. 2, P. 253.
5. Patent of Russian Federation No 2056899, publ. Mar. 27, 1996.
6. Khamizov R. Kh., Mjasoedov B. F., Rudenko B. A., Tikhonov N. A. Reports of the Academy of Science, 1997, Vol. 356, No 2, p.p. 216-218
7. D. N. Muraviev, R. Kh. Khamizov, N. A. Tikhonov, V. V. Kirshin. Langmuir, 1997, V. 13, No. 26, p.p. 7186-7192.
8. U.S. Pat. No. 4,673,507, publ. Jun. 16, 1987.
9. USSR Inventor's Certificate No 1183146, publ. Oct. 7, 1985.
10. USSR Inventor's Certificate No 1533750, publ. Jan. 7, 1990.
11. USSR Inventor's Certificate No 476009, publ. Jul. 5, 1975.
12. USSR Inventor's Certificate No 865818, publ. Sep. 23, 1981.
13. "Chemist's Directory". Under edition of Nicolsky B. P., in 6 volumes, v. 6, Khimizdat, Leningrad, 1963.
14. Ksenzenko V. I., Stasinevich D. M. "Chemistry and technology of iodine, bromine and their compounds", Moscow, "Chemistry", p. 304.
15. R. Khamizov, D. Muraviev, N. Tikhonov, A. Krachak, T. Zhiguleva, O. Fokina. Ind. Eng. Chem. Res., 1998, V37, No. 5, p.p. 1950-1955.
16. Russian Federation Patent No 2048644, publ. Nov. 20, 1995.
17. Russian Federation Patent No 2077363, publ. Apr. 20, 1997.

What is claimed is:

1. A method of mass-exchange sorption at processing an aqueous solution of inorganic substances for separation its components, comprising:
    passing an aqueous solution that is being processed through a layer of granulated sorption material;
    wherein space available for the aqueous solution that is being processed, between granules in the layer of granulated sorption material, is reduced,
    wherein as said layer, is used a layer of hydrophilic granulated sorption material selected from a strong base anion exchange resin or a strong acid cation exchange resin, this layer being under pressure on the order of 0.1 bar for prevention of its fluidization;
    wherein for reduction of the space available for the aqueous solution that is being processed, between the granules in the layer of hydrophilic granulated sorption material, this layer is previously substantially filled with an organic liquid or the mixture of organic liquids, which are not miscible with water and with the aqueous solution that is being processed and does not chemically react with components of the aqueous solution that is being processed and with said hydrophilic granulated sorption material; and
    wherein the solution that is being processed introduces along a phase boundary between the said organic liquid or the mixture of organic liquids and a surface of the granules in said layer of the hydrophilic granulated sorption material, coating thereby each granule of said sorption material with a finest flowing film that flows via the points of contact of the coated granules.

2. The method of claim 1,
    wherein said organic liquid or said mixture of organic liquids has a density lower than water density, and
    wherein the aqueous solution that is being processed passes downward through the layer of hydrophilic granulated sorption material previously substantially filled with said organic liquid or the mixture of organic liquids.

3. The method of claim 2 wherein said organic liquid is selected or said mixture of organic liquids is a mixture of substances selected from a group consisting of:
    paraffins, unsaturated hydrocarbons, aromatic compounds, organoelemental compounds, high alcohols, ketones, carboxyl acids, and simple and complex ethers.

4. The method of claim 1,
    wherein said organic liquid or said mixture of organic liquids has a density higher than a density of the aqueous solution that is being processed, and
    wherein the aqueous solution that is being processed passes upward through the layer of hydrophilic granulated sorption material previously substantially filled with the said organic liquid or the said mixture of organic liquids.

5. The method of claim 4 wherein said organic liquid is selected or said mixture of organic liquids is a mixture of substances is selected from a group consisting of:
    halogen-substituted paraffins, perfluorocarbons, halogen-substituted unsaturated hydrocarbons, halogen-substituted or nitro-substituted aromatic compounds, organoelemental matters, cyclocompounds of higher alcohols series, ketones, carboxylic acids, alcohol, and simple and complex ethers.

* * * * *